United States Patent
Ogura

(10) Patent No.: US 10,091,395 B2
(45) Date of Patent: Oct. 2, 2018

(54) IMAGE FORMING APPARATUS, METHOD, AND COMPUTER-READABLE RECORDING MEDIUM FOR LOGIN AND LOGOUT MANAGEMENT BASED ON MULTIPLE USER AUTHENTICATION FACTORS

(71) Applicant: Yoshimitsu Ogura, Kanagawa (JP)

(72) Inventor: Yoshimitsu Ogura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/368,948

(22) Filed: Dec. 5, 2016

(65) Prior Publication Data

US 2017/0163847 A1   Jun. 8, 2017

(30) Foreign Application Priority Data

Dec. 8, 2015 (JP) .................................. 2015-239319
Sep. 27, 2016 (JP) .................................. 2016-188591

(51) Int. Cl.
    *H04N 1/00* (2006.01)
    *H04N 1/44* (2006.01)

(52) U.S. Cl.
    CPC ......... *H04N 1/442* (2013.01); *H04N 1/00891* (2013.01); *H04N 1/4426* (2013.01); *H04N 1/4433* (2013.01); *H04N 2201/0094* (2013.01)

(58) Field of Classification Search
    CPC .. H04N 1/442; H04N 1/4433; H04N 1/00891; H04N 1/4426; H04N 2201/0094
    See application file for complete search history.

(56) References Cited

U.S. PATENT DOCUMENTS

| | | | |
|---|---|---|---|
| 8,228,512 B2 | 7/2012 | Ogura et al. | |
| 8,245,292 B2 * | 8/2012 | Buer | G06F 21/34 713/172 |
| 8,719,584 B2 * | 5/2014 | Mullin | G06F 1/1626 713/182 |
| 8,911,054 B2 | 12/2014 | Kitamura et al. | |
| 2008/0084972 A1 * | 4/2008 | Burke | G06Q 10/107 379/88.02 |
| 2008/0225070 A1 | 9/2008 | Morishita et al. | |
| 2009/0028586 A1 | 1/2009 | Yamashiro et al. | |
| 2010/0196025 A1 | 8/2010 | Ogura | |

(Continued)

FOREIGN PATENT DOCUMENTS

JP     2004-331832     11/2004
JP     5541407     5/2014

(Continued)

*Primary Examiner* — Ming Hon
(74) *Attorney, Agent, or Firm* — Harness, Dickey & Pierce P.L.C.

(57) ABSTRACT

An image forming apparatus includes a first authenticator, a second authenticator, and an apparatus authenticator. The first authenticator is configured to perform first authentication. The second authenticator is configured to perform second authentication. The apparatus authenticator is configured to permit a user who has been authenticated in both the first authentication and the second authentication to use the image forming apparatus, and cancel the permission of use of the image forming apparatus for the user when the authentication of the user is canceled in at least one of the first authentication and the second authentication.

17 Claims, 17 Drawing Sheets

(56) References Cited

U.S. PATENT DOCUMENTS

| | | | |
|---|---|---|---|
| 2010/0293403 A1* | 11/2010 | Yamashita | H04N 1/00687 713/323 |
| 2010/0299530 A1* | 11/2010 | Bell | G06F 21/32 713/186 |
| 2011/0020026 A1* | 1/2011 | Yoshihara | G03G 15/50 399/80 |
| 2011/0090269 A1 | 4/2011 | Ogura | |
| 2011/0187305 A1 | 8/2011 | Ogura | |
| 2011/0193930 A1 | 8/2011 | Ogura | |
| 2013/0227291 A1* | 8/2013 | Ahmed | H04L 63/0281 713/171 |
| 2014/0331286 A1* | 11/2014 | Davis | G07C 9/00031 726/4 |
| 2015/0002871 A1 | 1/2015 | Ono et al. | |
| 2015/0043790 A1 | 2/2015 | Ono et al. | |
| 2015/0237227 A1* | 8/2015 | Saisho | H04N 1/00875 348/77 |
| 2015/0242167 A1* | 8/2015 | Yamaguchi | G06F 3/1222 358/1.14 |
| 2015/0281497 A1 | 10/2015 | Ono et al. | |
| 2016/0150124 A1* | 5/2016 | Panda | H04N 1/442 358/1.13 |

FOREIGN PATENT DOCUMENTS

| | | |
|---|---|---|
| JP | 2015-011181 | 1/2015 |
| JP | 2015-142193 | 8/2015 |

\* cited by examiner

FIG.6

| DATA TYPE | DATA 1 | DATA 2 | ... | DATA 300 |
|---|---|---|---|---|
| USER NUMBER | 101001 | 101002 | ... | 101300 |
| NAME | AAAA | BBBB | ... | XXXX |
| E-MAIL ADDRESS | aaa@bbb.ccc | bbb@bbb.ccc | ... | xxx@bbb.ccc |
| LOGIN ID | AA_AA | BB_BB | ... | XX_XX |
| LOGIN PASSWORD | 12345 | abcdef | ... | xxxxx |
| WIRELESS TAG ID | 00522213 | 00535213 | ... | 05245219 |
| AUTHENTICATION INFORMATION | {222, 241, 52, ..., 40, -167, -58} | {56, 111, -3, ..., -120, 47, 208} | ... | {186, 241, -36, ..., 20, -67, 158} |

| WIRELESS TAG ID | USER ID |
|---|---|
| 00522213 | user_001 |
| 00535213 | user_002 |
| ... | ... |
| 05245219 | user_300 |

| USER ID | AUTHENTICATION INFORMATION |
|---|---|
| user_001 | {222, 241, 52, ..., 40, -167, -58} |
| user_002 | {56, 111, -3, ..., -120, 47, 208} |
| ... | ... |
| user_300 | {186, 241, -36, ..., 20, -67, 158} |

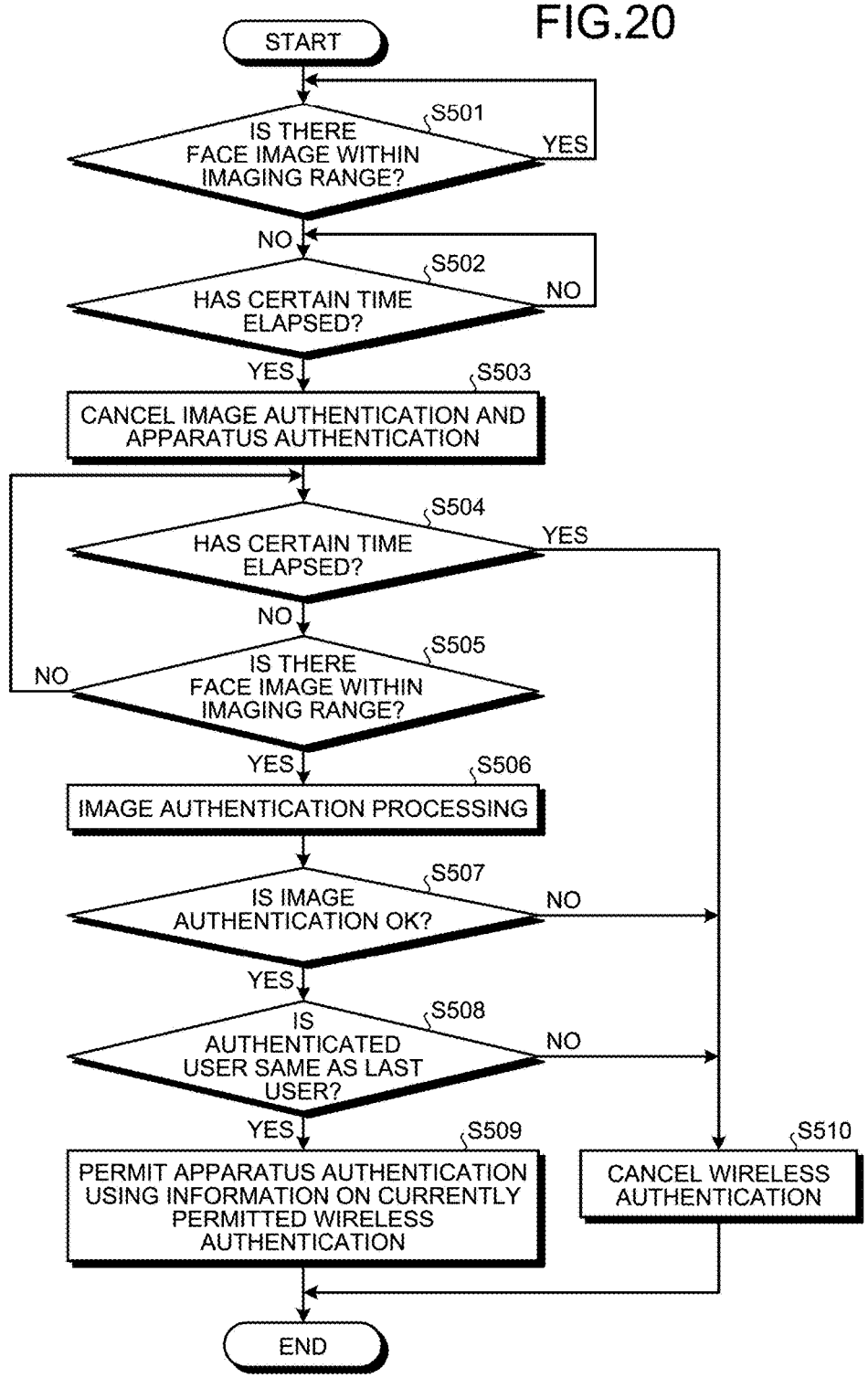

IMAGE FORMING APPARATUS, METHOD, AND COMPUTER-READABLE RECORDING MEDIUM FOR LOGIN AND LOGOUT MANAGEMENT BASED ON MULTIPLE USER AUTHENTICATION FACTORS

CROSS-REFERENCE TO RELATED APPLICATIONS

The present application claims priority under 35 U.S.C. § 119 to Japanese Patent Application No. 2015-239319, filed Dec. 8, 2015 and Japanese Patent Application No. 2016-188591, filed Sep. 27, 2016. The contents of which are incorporated herein by reference in their entirety.

BACKGROUND OF THE INVENTION

1. Field of the Invention

The present invention relates to an image forming apparatus, a method of authentication, and a computer-readable recording medium.

2. Description of the Related Art

In recent years, authentication techniques such as face authentication that do not require operations such as password input and can prevent identity theft based on the lost and theft or the like of IC cards have become widespread as a method of authentication that authenticates users. Among them, a security technique that images the face of a user by a camera, authenticates the face to identify an individual, and performs login authentication to an image forming apparatus is becoming widespread.

Japanese Unexamined Patent Application Publication No. 2015-011181 discloses a technique that detects the motion of a person on the basis of an image taken by an imaging unit and shifts from a normal mode to a sleep mode when the presence of the person can no longer be detected within a detection range.

In the face authentication using a camera, it is desired that logout be done immediately after the end of use in order to prevent, after the end of use by an authenticated user, use by another user based on identity theft. The method that changes an operation mode or causes logout simply by the fact that a face (person) is not detected as in the technique described in Japanese Unexamined Patent Application Publication No. 2015-011181 is highly likely to erroneously recognize the end of use.

SUMMARY OF THE INVENTION

According to one aspect of the present invention, an image forming apparatus includes a first authenticator, a second authenticator, and an apparatus authenticator. The first authenticator is configured to perform first authentication. The second authenticator is configured to perform second authentication. The apparatus authenticator is configured to permit a user who has been authenticated in both the first authentication and the second authentication to use the image forming apparatus, and cancel the permission of use of the image forming apparatus for the user when the authentication of the user is canceled in at least one of the first authentication and the second authentication.

BRIEF DESCRIPTION OF THE DRAWINGS

FIG. 6 is a diagram of an example of user information according to the embodiment;

FIG. 7 is a diagram of another example of the user information according to the embodiment;

FIG. 8 is a diagram of still another example of the user information according to the embodiment;

FIG. 20 is a flowchart of an example of authentication processing of a modification.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
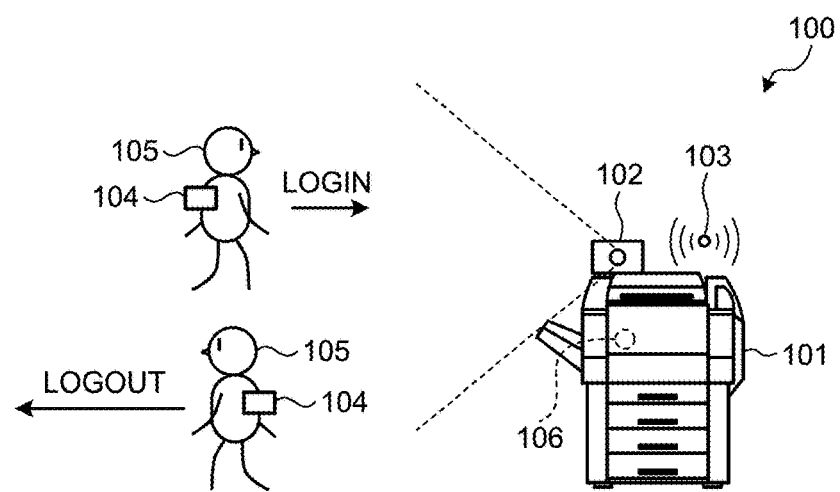
FIG. 1 is a diagram of an example of a configuration of an image forming system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image forming apparatus, an image forming system, a method of authentication, and a computer-readable recording medium that can determine the end of use more appropriately.

The image forming apparatus of the present embodiment performs authentication (hybrid authentication processing) that combines authentication (first authentication) such as authentication using short-range wireless and face authentication (second authentication). When the authentication result of the face authentication matches the authentication result of short-range wireless authentication, login to the image forming apparatus is permitted. On condition that the authentication can no longer be done through face authentication and that the authentication can no longer be done through wireless authentication, it is determined that use by a user for which login had been permitted has ended. With this processing, erroneous recognition of the end of use can be reduced.

System Configuration

FIG. 1 is a diagram of an example of a configuration of an image forming system according to an embodiment. The following describes the configuration of an image forming system 100 according to the present embodiment with reference to FIG. 1.

As illustrated in FIG. 1, the image forming system 100 includes an image forming apparatus 101 and a radio frequency identification (RFID) tag 104 that a user 105 carries.

The image forming apparatus 101 is an image forming apparatus such as a multifunction peripheral (MFP), a copier, a printer, a facsimile apparatus, or a scanner apparatus. The MFP is a multifunction peripheral having at least two functions among a copying function, a printer function, a scanner function, and a facsimile function. The image forming apparatus 101 includes a camera 102, an RFID tag reader 103, and a moving object sensor 106. The RFID tag reader 103 receives certain information such as a wireless tag ID from an RFID tag 104 (an example of a wireless tag) present within a certain range. The camera 102 takes images. The moving object sensor 106 detects a moving object (a user or the like) present within a certain range. The RFID is a technique that performs short-range wireless communication using electromagnetic waves, radio waves, or the like between the RFID tag 104 that stores therein certain information such as the wireless tag ID and the RFID tag reader 103 and is an example of the short-range wireless communication.

When the RFID tag 104 is a passive tag, for example, the RFID tag reader 103 emits a certain radio wave to the detection range of the RFID tag reader 103 described below. Upon reception of the radio wave emitted from the RFID tag reader 103, the RFID tag 104 operates with the received radio wave as electric power and transmits the certain information such as the wireless tag ID stored therein in advance to the RFID tag reader 103.

The passive tag is a tag for the RFID operating with radio waves from an RFID tag reader as an energy source and does not require to incorporate any battery. The antenna of the passive tag reflects part of the radio waves from the RFID tag reader and returns information such as a wireless tag ID while carrying the information on this reflected wave. The intensity of this reflection is extremely small, and although the passive tag is shorter in communication distance than an active tag, which transmits radio waves on its own electric power, the passive tag is low in price and operates almost eternally.

The camera 102 is an imaging apparatus installed so as to cause the user 105 who uses the image forming apparatus 101 to be contained in a taken image, for example.

Figure 2:
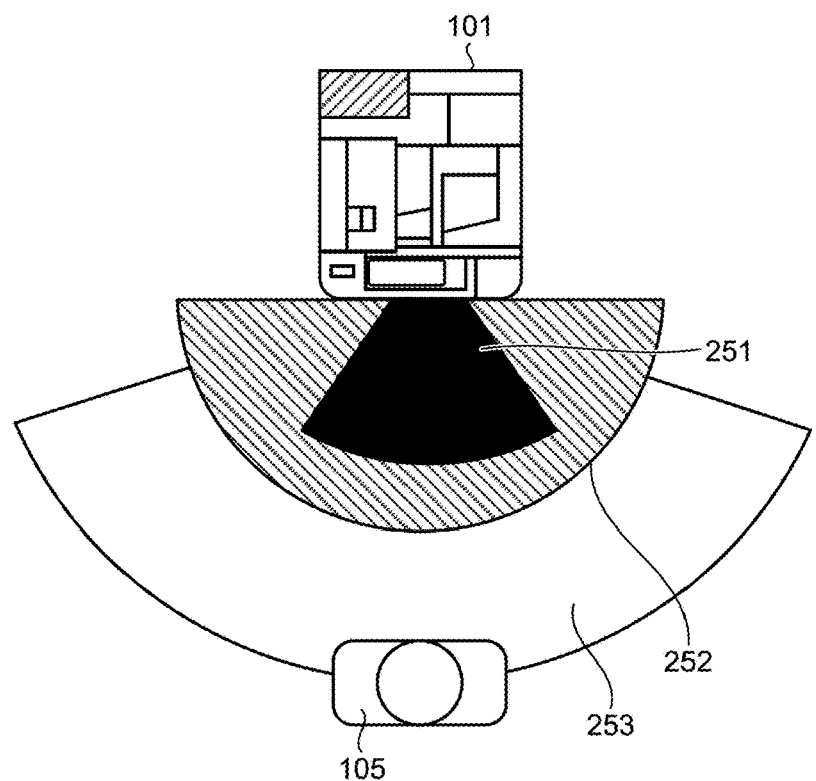
FIG. 2 is a diagram of an example of an imaging range of a camera and detection ranges of respective sensors according to the embodiment.

FIG. 2 is a diagram of an example of an imaging range of a camera and detection ranges of respective sensors according to an embodiment. FIG. 2 illustrates an example of an imaging range 251 of the camera 102, a detection range 252 of the RFID tag reader 103, and a detection range 253 of the moving object sensor 106.

FIG. 2 illustrates the detection range 252 of the RFID tag reader 103 when the image forming apparatus 101 is viewed from above. In the example in FIG. 2, the image forming apparatus 101 incorporates a patch antenna, for example, and forms the detection range 252 having a fan shape (with an angle of 150°, for example) on the front face of the image forming apparatus 101 (downward in FIG. 2). Upon detection of the user 105 by the moving object sensor 106, the RFID tag reader 103 emits a certain radio wave to the detection range 252. With this operation, for example, when the user 105 carrying the RFID tag 104 approaches a position apart from the front face of the image forming apparatus 101 within a certain distance (within 3 meters, for example), the certain information (such as the wireless tag ID) stored in the RFID tag 104 is automatically transmitted to the image forming apparatus 101. The camera 102 starts up (operates) upon detection of the user 105 by the moving object sensor 106.

In the present embodiment, the image forming apparatus 101 stores therein information indicating users registered in advance and performs the authentication of the RFID tag 104 (hereinafter, may be referred to as "wireless authentication") (first authentication) on the basis of the wireless tag ID received from the RFID tag 104 and the information indicating users registered in advance in a storage unit of the image forming apparatus 101 described below. In addition, the image forming apparatus 101 performs the authentication of the user 105 taken as an image (hereinafter, may be referred to as "image authentication") (second authentication) on the basis of the face image of the user 105 contained in an image taken by the camera 102 and characteristic information on the face of the users registered in advance in the storage unit of the image forming apparatus 101 described below, for example. Furthermore, the image forming apparatus 101 performs login authentication for the user 105 to use the image forming apparatus 101 (hereinafter, may be referred to as "apparatus authentication") on the basis of, when the wireless authentication and the image authentication have been permitted, information indicating a user corresponding to the RFID tag 104 for which the wireless authentication has been permitted and information indicating a user for which the image authentication has been permitted. When the user of the RFID tag 104 for which the wireless authentication has been permitted and the user for which the image authentication has been permitted are the same user, the image forming apparatus 101 permits the user to log in to the image forming apparatus 101, for example.

Thus, when both the wireless authentication using the RFID tag 104 and the image authentication by the image taken by the camera 102 have been permitted and the user of the RFID tag 104 for which the wireless authentication has been permitted and the user for which the image authentication has been permitted are the same user, the image forming apparatus 101 permits the login by the user. With this processing, the image forming apparatus 101 according to the present embodiment can cause the user 105 of the image forming apparatus 101 to improve the accuracy of the authentication of a method of authentication on the basis of a taken image such as the image authentication simply by carrying the RFID tag 104.

FIG. 1 illustrates that when the user 105 approaches the image forming apparatus 101 and is authenticated in both the wireless authentication and the face authentication, login is permitted. In the present embodiment, further, when the authentication can no longer be done in both the wireless authentication and the face authentication owing to that the user 105 has left the image forming apparatus 101, for example, it is determined that the user 105 has ended use, and the user is logged out.

The moving object sensor 106 is used to return the image forming apparatus 101 from a power saving state to a normal state when the user 105 or the like has entered the detection range 253, for example. The normal state is an example of a state that executes information processing in accordance with an operation that the user has performed. When the image forming apparatus 101 operates in the normal state, electric power required for the execution of the information processing is supplied to various parts of the image forming apparatus 101. The power saving state is an example of a state that temporarily stops the operation of at least a part of the image forming apparatus 101. When the image forming apparatus 101 operates in the power saving state, electric power supply to at least a part of the image forming apparatus 101 is stopped, and the power consumption of the image forming apparatus 101 is less than when operating in the normal state. However, even when the image forming apparatus 101 operates in the power saving state, electric power supply to the moving object sensor 106 is performed to enable the various parts to perform operations when in the power saving state.

The sizes of the imaging range 251, the detection range 252, and the detection range 253, which are any size, can be 0.6 meter, 1 meter, and 2 meters, respectively, for example. By thus setting the detection range 253 to be larger than the other ranges, electric power can be supplied to the RFID tag reader 103 and the camera 102 to operate them before the user 105 enters the imaging range 251 or the detection range 252, for example.

Even in a configuration that does not include the power saving state or in the power saving state, in a configuration in which electric power is supplied to the RFID tag reader 103 and the camera 102, the moving object sensor 106 is not necessarily included.

The system configuration in FIG. 1 is merely an example. In place of the image forming apparatus 101, an information processing apparatus such as a personal computer (PC), a tablet terminal, a smartphone, a game machine, or a teleconference apparatus having an authentication function for users similar to that of the image forming apparatus 101 may be used, for example.

The camera 102, the RFID tag reader 103, and the like may be external ones.

The RFID tag 104 may be an RFID active tag, semiactive tag, or the like. The RFID tag 104 is an example of a wireless tag. The wireless tag may be a wireless terminal that performs communication by a short-range wireless system (Bluetooth (registered trademark) Low Energy (hereinafter, referred to as "BLE") or Near Field Communication (NFC), for example) different from the RFID. In place of the wireless tag, a portable terminal or the like installing the wireless tag or the like may be used. The authentication using the RFID tag 104 (the wireless authentication) is thus an example and may be replaced with another method of authentication using an object that stores therein user-related authentication information.

The method of authentication to be combined with the wireless authentication is not limited to the method of authentication using the image taken of the user, and may be various methods of authentication that perform user authentication using characteristic information indicating the biometric characteristic of the user, for example. Examples of the methods of authentication include authentication by the walking pattern of the user, authentication by the key input speed or timing of the user, voice authentication, fingerprint authentication, iris authentication, and vein authentication.

Hardware Configuration

Figure 3:
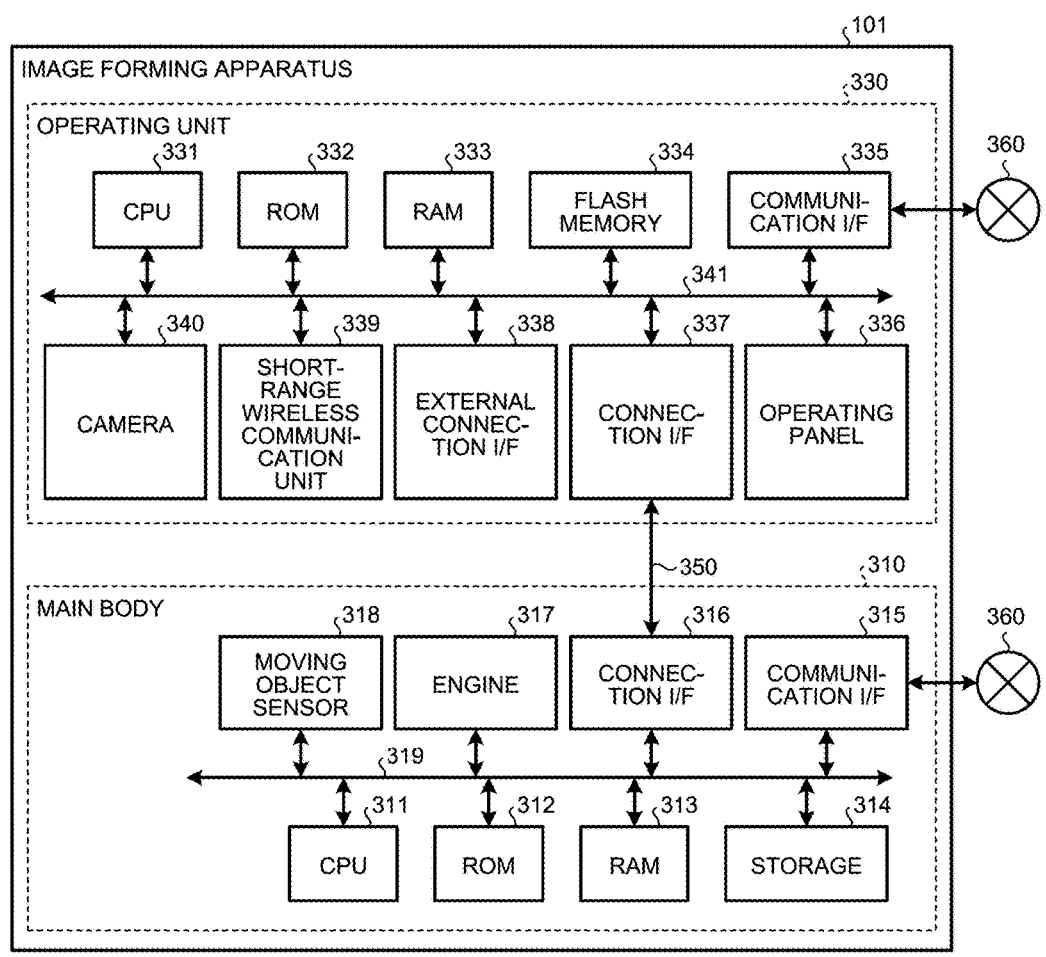
FIG. 3 is a diagram of an example of a hardware configuration of an image forming apparatus according to the embodiment.

FIG. 3 is a diagram of an example of a hardware configuration of the image forming apparatus according to the present embodiment. The following describes the hardware configuration of the image forming apparatus 101 according to the present embodiment with reference to FIG. 3.

As illustrated in FIG. 3, the image forming apparatus 101 includes a main body 310 having image forming engines that implement various kinds of image forming functions such as a copying function, a scanner function, a fax function, and a printer function and an operating unit 330 that accepts operations by the user on the respective image forming engines, a controller, or the like. Accepting operations by the user is a concept including accepting information (including a signal indicating screen coordinate values) input in accordance with the operations by the user.

The main body 310 and the operating unit 330 are connected to each other in a mutually communicable manner via an exclusive communication path 350. Although the communication path 350 may be based on the Universal Serial Bus (USB) standard, for example, this is not limiting; it may be based on any standard regardless of being wired or wireless. The main body 310 performs an operation corresponding to an operation accepted by the operating unit 330. The main body 310 can also communicate with an external apparatus such as a client PC and can also perform an operation corresponding to an instruction received from the external apparatus.

Hardware Configuration of Main Body

As illustrated in FIG. 3, the main body 310 includes a central processing unit (CPU) 311, a read only memory (ROM) 312, a random access memory (RAM) 313, a storage 314, a communication interface (I/F) 315, a connection I/F 316, an engine 317, a moving object sensor 318, and a system bus 319.

The CPU 311 comprehensively controls the operation of the main body 310. The CPU 311 executes a computer program stored in the ROM 312, the storage 314, or the like with the RAM 313 as a work area and thereby controls the operation of the entire main body 310. The CPU 311 implements various kinds of functions such as the copying function, the scanner function, the fax function, and the printer function, for example.

The ROM 312 is a non-volatile memory that stores therein a basic input/output system (BIOS) executed at the time of the startup of the main body 310 and various kinds of settings, for example. The RAM 313 is a volatile memory used as the work area of the CPU 311 and the like. The storage 314 is a non-volatile storage device that stores therein an operating system (OS), application programs, and various kinds of data, for example. The storage 314 includes a hard disk drive (HDD) or a solid stated drive (SSD), for example.

The communication I/F 315 is a network interface for connecting the main body 310 to a network 360 and performing communication with an external apparatus connected to the network 360. The connection I/F 316 is an interface for performing communication with the operating unit 330 via the communication path 350.

The engine 317 is hardware that performs general-purpose processing and processing other than communication for implementing functions such as the copying function, the scanner function, the fax function, and the printer function. The engine 317 includes a scanner that reads document images, a plotter that performs printing on a sheet material such as paper, and a fax unit that performs fax communication, for example. The engine 317 may include specific options such as a finisher that sorts printed sheet materials and an automatic document feeder (ADF) that automatically feeds documents.

The moving object sensor 318 is a sensor that detects a moving object (a user or the like) present within a detection range around the image forming apparatus 101. The moving object sensor 318 includes a pyroelectric sensor, for example. The moving object sensor 318 corresponds to the moving object sensor 106 illustrated in FIG. 1.

The system bus 319 is a transmission path that connects the above components to each other and transmits address signals, data signals, various kinds of control signals, and the like.

Hardware Configuration of Operating Unit

As illustrated in FIG. 3, the operating unit 330 includes a CPU 331, a ROM 332, a RAM 333, a flash memory 334, a communication I/F 335, an operating panel 336, a connection I/F 337, an external connection I/F 338, a short-range wireless communication unit 339, a camera (an imaging apparatus) 340, and a system bus 341.

The CPU 331 comprehensively controls the operation of the operating unit 330. The CPU 331 executes a computer program stored in the ROM 332, the flash memory 334, or the like with the RAM 333 as a work area and thereby controls the operation of the entire operating unit 330. The CPU 331 implements various kinds of functions such as causing the operating panel 336 to display information (images) corresponding to input accepted from the user, for example.

The ROM 332 is a non-volatile memory that stores therein a BIOS executed at the time of the startup of the operating unit 330 and various kinds of settings, for example. The RAM 333 is a volatile memory used as the work area of the CPU 331 and the like. The flash memory 334 is a non-volatile storage device that stores therein an operating system (OS), application programs, and various kinds of data, for example.

The communication I/F 335 is a network interface for connecting the operating unit 330 to the network 360 and performing communication with an external apparatus connected to the network 360.

The operating panel 336 is an apparatus having an input function and a display function that accepts various kinds of input corresponding to operations by the user and displays various kinds of information (information corresponding to the accepted operation, information indicating the operation state of the image forming apparatus 101, and setting information, for example). The operating panel 336 includes a liquid crystal display (LCD) installing a touch panel function, for example. The operating panel 336 is not limited to the liquid crystal display and may include a display device of electro-luminescence installing a touch panel function, for example. The operating panel 336 can include an operating unit such as a hardware key or a display unit such as a lamp in place of or in addition to the touch panel function.

The connection I/F 337 is an interface for communicating with the main body 310 via the communication path 350. The external connection I/F 338 is an interface such as a USB for connecting an external apparatus thereto.

The short-range wireless communication unit 339 is a short-range wireless apparatus for performing communication with a wireless tag within a certain range by short-range wireless communication. The short-range wireless communication unit 339 includes the RFID tag reader 103 illustrated in FIG. 1, for example, and receives certain information from an RFID passive tag that returns a response to a radio wave transmitted from the short-range wireless communication unit 339, an RFID active tag that transmits a radio wave from the tag itself, or the like. The short-range wireless communication unit 339 may be a short-range wireless apparatus that performs short-range wireless communication such as BLE or NFC.

The camera 340 is an imaging apparatus that takes an image within a certain imaging range. The camera 340 corresponds to the camera 102 illustrated in FIG. 1.

The system bus 341 is a transmission path that connects the components to each other and transmits address signals, data signals, various kinds of control signals, and the like.

Software Configuration

Figure 4:
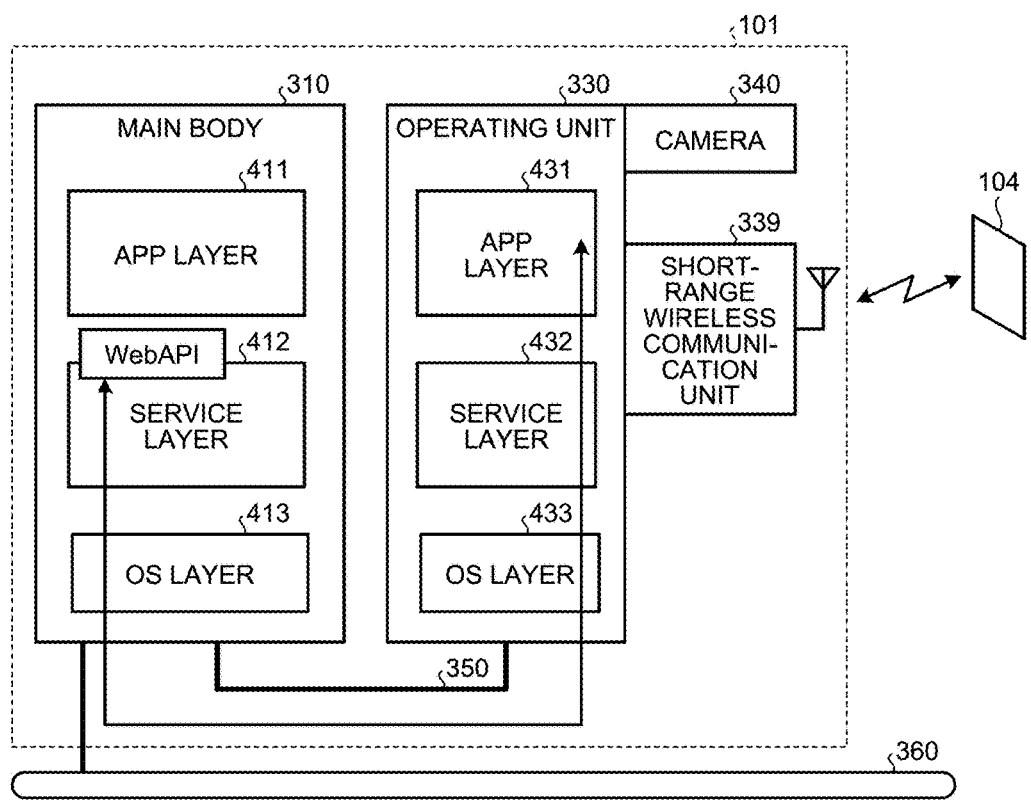
FIG. 4 is a diagram of an example of a software configuration of the image forming apparatus according to the embodiment.

FIG. 4 is a diagram of an example of a software configuration of the image forming apparatus according to the present embodiment. The following describes the software configuration of the image forming apparatus 101 according to the present embodiment with reference to FIG. 4.

As illustrated in FIG. 4, the main body 310 of the image forming apparatus 101 includes an app layer 411, a service layer 412, and an OS layer 413. The entities of the app layer 411, the service layer 412, and the OS layer 413 are various kinds of software stored in the ROM 312, the storage 314, or the like. The CPU 311 executes these pieces of software (computer programs), thereby providing various kinds of functions of the main body 310.

The app layer 411 is application software (hereinafter, may be referred to simply as an "app") for operating hardware resources to provide certain functions. Examples of the app include a copy app for providing a copying function, a scanner app for providing a scanner function, a fax app for providing a fax function, and a printer app for providing a printer application.

The service layer 412 is software that is interposed between the app layer 411 and the OS layer 413 to provide the app of the app layer 411 with an interface for using the hardware resources of the main body 310. Specifically, the service layer 412 provides the function of performing the acceptance of operation requests to the hardware resources and the arbitration of the operation requests. Examples of the operation requests that the service layer 412 accepts include requests for reading by a scanner and printing by a plotter. The function of the interface by the service layer 412 is provided not only to the app layer 411 of the main body 310 but also to an app layer 431 of the operating unit 330. The interface function of WebAPI of the service layer 412 is provided by WebAPI, for example. In other words, the app layer 431 of the operating unit 330 can also implement functions using the hardware resources (the engine 317, for example) of the main body 310 via the interface function of WebAPI of the service layer 412 of the main body 310.

The OS layer 413 is basic software (an operating system) for providing basic functions that control the hardware of the main body 310. The service layer 412 converts requests for using the hardware resources from the various kinds of apps into commands that the OS layer 413 can interpret and delivers the requests to the OS layer 413. The OS layer 413 executes the commands, thereby causing the hardware resources to perform operations corresponding to the requests by the apps.

As illustrated in FIG. 4, the operating unit 330 of the image forming apparatus 101 includes the app layer 431, a service layer 432, and an OS layer 433. The app layer 431, the service layer 432, and the OS layer 433 of the operating unit 330 are similar to the main body 310 in their hierarchical structure. However, functions provided by the app of the app layer 431 and the types of operation requests that the service layer 432 can accept are different from those of the main body 310.

Although the app of the app layer 431 may be software that operates the hardware resources of the operating unit 330 to provide certain functions, it mainly provides the function of a user interface (UI) for performing operations and display about the functions of the main body 310. The app of the app layer 431 provides an authentication function using the short-range wireless communication unit 339, the camera 340, and the like of the operating unit 330.

In the present embodiment, to maintain functional independency, the software of the OS layer 413 of the main body 310 and the software of the OS layer 433 of the operating unit 330 are different from each other. In other words, the main body 310 and the operating unit 330 operate independently of each other on separate operating systems. Linux (registered trademark) can be used as the software of the OS layer 413 of the main body 310, whereas Android (registered trademark) can be used as the software of the OS layer 433 of the operating unit 330, for example.

As described above, in the image forming apparatus 101 of the present embodiment, the main body 310 and the operating unit 330 operate on separate operating systems, and the communication between the main body 310 and the operating unit 330 is performed not as inter-process communication within the common apparatus but as communication between different apparatuses. Examples thereof include an operation (command communication) to transfer information (instruction contents from the user) that the operating unit 330 has accepted to the main body 310 and an operation in which the main body 310 transmits information to the operating unit 330. In this example, the operating unit 330 performs command communication to the main body 310 and can thereby use the functions of the main body 310. Examples of the information transmitted from the main body 310 to the operating unit 330 include an operation execution state in the main body 310 and contents set by the main body 310. In the present embodiment, electric power to the operating unit 330 is supplied from the main body 310 via the communication path 350, and the power supply control of the operating unit 330 can be performed separately from (independently of) the power supply control of the main body 310.

Functional Configuration

Figure 5:
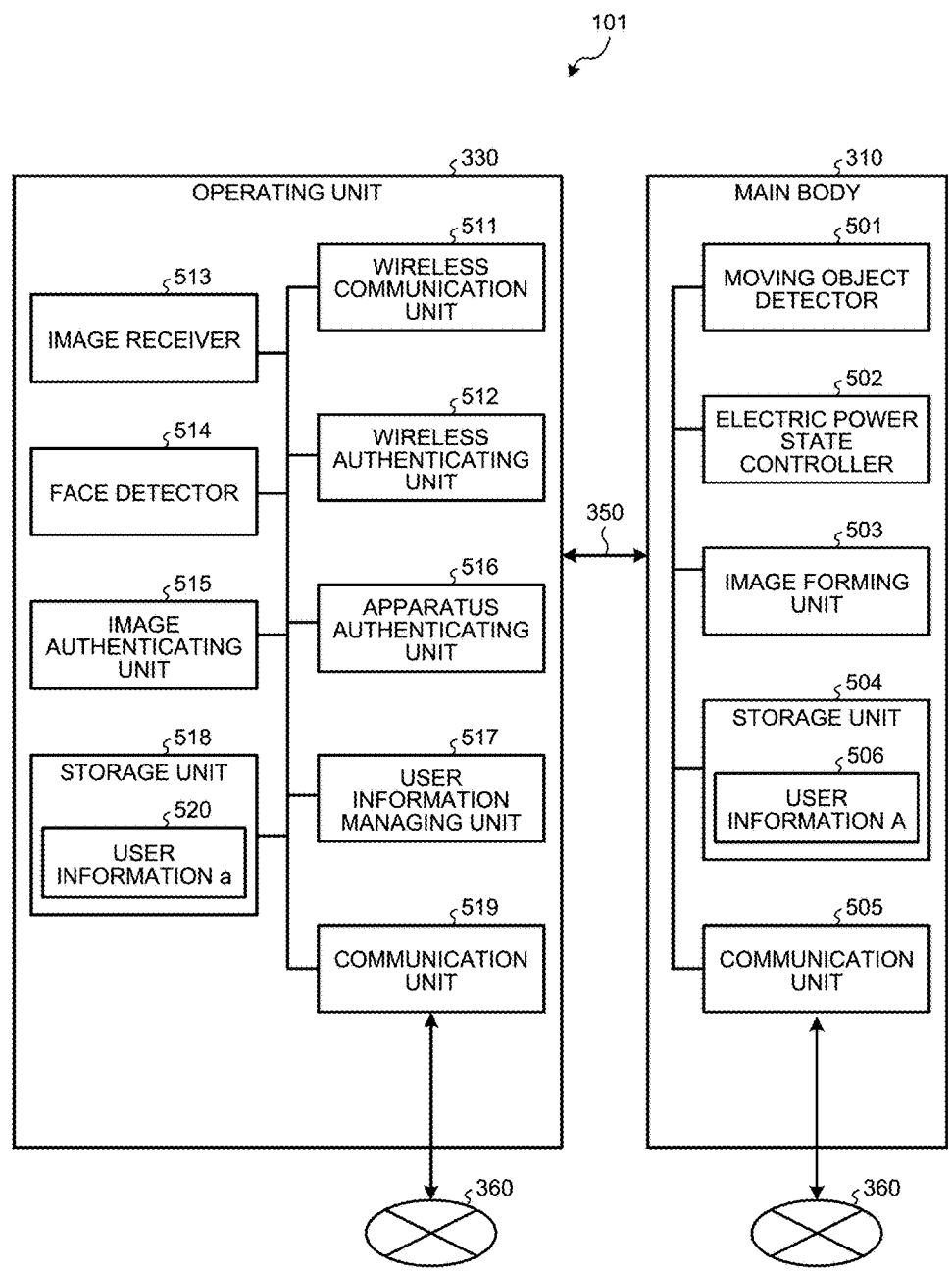
FIG. 5 is a diagram of an example of a functional configuration of the image forming apparatus according to the embodiment.

FIG. 5 is a diagram of an example of a functional configuration of the image forming apparatus according to the present embodiment. The following describes the functional configuration of the image forming apparatus 101 according to the present embodiment with reference to FIG. 5.

Functional Configuration of Main Body

As illustrated in FIG. 5, the main body 310 of the image forming apparatus 101 includes a moving object detector 501, an electric power state controller 502, an image forming unit 503, a storage unit 504, and a communication unit 505.

The moving object detector 501 is a functional unit that detects a moving object (a person, for example) present within a detection range around the image forming apparatus 101 using the moving object sensor 318. The moving object detector 501 is implemented by a computer program operated by the CPU 311 illustrated in FIG. 3, for example. Upon detection of a moving object within the detection range, the moving object detector 501 reports the fact that the moving object has been detected to the electric power state controller 502.

The electric power state controller 502 is a functional unit that controls the electric power states of the main body 310 and the operating unit 330. The electric power state controller 502 is implemented by the computer program operated by the CPU 311 illustrated in FIG. 3, for example. When the image forming apparatus 101 is not in use beyond a period of time set in advance, the electric power state controller 502 shifts the image forming apparatus 101 to the power saving state, in which less power is consumed than in the normal state, in which image forming processing is enabled. In the power saving state, power consumption can be reduced by stopping the functions of the operating unit 330 and the engine 317 and the storage 314 of the main body 310, for example. Upon acceptance of the report indicating the fact that a moving object has been detected from the moving object detector 501 while the image forming apparatus 101 is in the power saving state, the electric power state controller 502 returns the operating unit 330 from the power saving state to the normal state, in which normal operation is enabled. The electric power state controller 502 returns the operating unit 330 from the power saving state to the normal state by reporting a return instruction to the operating unit 330 via the communication path 350. The electric power state controller 502 may shift the operating unit 330 from the power saving state to the normal state when the user has been logged out by an apparatus authenticating unit 516.

In the normal state, electric power is supplied to the functional units (the camera 340, an image receiver 513, and the like) concerning the image authentication and the functional units (the short-range wireless communication unit 339 and a wireless communication unit 511) concerning the wireless authentication. So long as electric power is supplied to at least the functional units concerning the image authentication and the wireless authentication, the operating unit 330 may be made to transit to a state other than the normal state. The electric power state controller 502 reports the fact that the normal state has been restored (power-on) to various parts (the image receiver 513, the wireless communication unit 511, the apparatus authenticating unit 516, and the like) within the operating unit 330.

The electric power state controller 502 may start up the camera 102 when the moving object detector 501 (moving object sensor 106) detects a moving object (the user 105). The function of starting up the camera 102 when the moving object is detected may be included in the operating unit 330.

The image forming unit 503 is a functional unit that executes various kinds of image forming functions (a printer function, a copying function, a scanner function, and a fax function, for example) of the image forming apparatus 101. The image forming unit 503 is implemented by the engine 317 illustrated in FIG. 3 and the computer program operated by the CPU 311 illustrated in FIG. 3, for example.

The storage unit 504 is a functional unit that stores therein various information such as user information A 506 containing information indicating the users of the image forming apparatus 101 registered in advance. The storage unit 504 is implemented by the RAM 313 and the storage 314 illustrated in FIG. 3 and the computer program operated by the CPU 311 illustrated in FIG. 3, for example.

The communication unit 505 is a functional unit that connects the main body 310 to the network 360 to perform communication with the external apparatus connected to the network 360. The communication unit 505 is implemented by the communication I/F 315 illustrated in FIG. 3 and the computer program operated by the CPU 311 illustrated in FIG. 3, for example.

The moving object detector 501, the electric power state controller 502, the image forming unit 503, the storage unit 504, and the communication unit 505 of the main body 310 illustrated in FIG. 5 illustrate the functions conceptually, and this configuration is not limiting; the functional units illustrated as independent functional units in the main body 310 illustrated in FIG. 5 may be configured as one functional unit, for example. In contrast, the function of any one functional unit in the main body 310 illustrated in FIG. 5 may be divided into a plurality of functions to be configured as a plurality of functional units.

Part or the whole of the moving object detector 501, the electric power state controller 502, and the image forming unit 503 of the main body 310 may be implemented not by the computer program as software but by hardware circuits such as a field-programmable gate array (FPGA) and an application specific integrated circuit (ASIC).

Functional Configuration of Operating Unit

As illustrated in FIG. 5, the operating unit 330 of the image forming apparatus 101 includes the wireless communication unit 511, a wireless authenticating unit 512 (a first authenticating unit), the image receiver 513, a face detector 514 (a detector), an image authenticating unit 515 (a second authenticating unit), the apparatus authenticating unit 516, a user information managing unit 517, a storage unit 518, and a communication unit 519.

The wireless communication unit 511 is a functional unit that receives certain information (a wireless tag ID or the like) from a wireless tag within a certain range by short-range wireless communication using the short-range wireless communication unit 339. The wireless communication unit 511 is implemented by the short-range wireless communication unit 339 illustrated in FIG. 3 and the computer program operated by the CPU 331 illustrated in FIG. 3, for example. The wireless communication unit 511 receives the certain information such as the wireless tag ID from the RFID tag 104 present within the detection range 252 of the RFID tag reader 103 illustrated in FIG. 2.

The wireless authenticating unit 512 is a functional unit that, based on the certain information that the wireless communication unit 511 has received and user information registered in advance, authenticates the wireless tag that has transmitted the certain information. The wireless authenticating unit 512 is implemented by the computer program operated by the CPU 331 illustrated in FIG. 3, for example. The wireless authenticating unit 512 authenticates (wirelessly authenticates) the RFID tag 104 on the basis of the wireless tag ID of the RFID tag 104 that the wireless communication unit 511 has received and the user information registered in advance (user information a 520 and the user information A 506 described below, for example).

When the user information registered in advance contains the wireless tag ID of the RFID tag 104 that the wireless communication unit 511 has received, the wireless authenticating unit 512 permits the authentication of the RFID tag 104.

The wireless authenticating unit 512 transmits the wireless tag ID received from the wireless communication unit 511 to the user information managing unit 517, for example. The wireless authenticating unit 512 receives a result (the presence or absence of a corresponding user, a user number when the corresponding user is present, and the like) received from the user information managing unit 517. When the corresponding user is present in the user information, short-range wireless authentication is enabled, whereas when the corresponding user is absent, the short-range wireless authentication is disabled. The wireless authenticating unit 512 transmits an authentication result to the apparatus authenticating unit 516. The wireless authenticating unit 512 outputs information indicating the user of the RFID tag 104 for which the authentication has been permitted to the apparatus authenticating unit 516. To hold the information indicating the user of the RFID tag 104 for which the authentication has been permitted, the wireless authenticating unit 512 may output the information to the storage unit 518 to store it therein.

The image receiver 513 receives images from the camera 340. The image receiver 513 is implemented by the computer program operated by the CPU 331 illustrated in FIG. 3, for example. The image receiver 513 causes the camera 340 to take an image of the front of the image forming apparatus 101 and receives an image of the user 105 present in front of the image forming apparatus 101 from the camera 340.

The face detector 514 is an example of the detector that detects the authentication information of the user. The face detector 514 detects the face image of the user, characteristic information extracted from the face image of the user (an example of characteristic information indicating biometric characteristics), and the like in the received image as the authentication information of the user, for example. When a type of authentication other than the face authentication is executed, authentication information for use in the other authentication may be detected in place of the face image or the like. Examples that may be detected as the authentication information include a walking pattern, key input speed, key input timing, voice characteristics, fingerprint characteristics, and vein characteristics. The face detector 514 is implemented by the computer program operated by the CPU 331 illustrated in FIG. 3, for example. Examples of the characteristic information of the face image include information on the shape, the relative position, and the like of various parts such as a face outline, an eye, a nose, a chin, and a cheekbone.

The face detector 514 detects a face image (a face area) from an image using the following method of face detection by Haar-like characteristics, for example. A Haar-like characteristic amount is a value obtained by subtracting from the value of the sum of the pixel values of black areas within a rectangle, which is an object to be calculated, within a search area the value of the sum of the pixel values of white areas. This rectangle may be arranged anyhow and anywhere within the search area, and there are tens of thousands of possibilities about the arrangement place within the search area. By boosting on these rectangles, weak identifiers within the search area are weighted by preliminary learning. Only a few tens of weak identifiers the degree of importance of which is higher are selected to create a strong identifier.

By this strong identifier (by a few white-and-black rectangle patterns indicating likelihood of being a human face), the area is determined to be a human face area or not.

When the characteristic information of the face image is used as the authentication information, the face detector 514 may further detect the characteristic information in the face image (the face area). The face detector 514 may extract characteristic points (13-dimensional data, for example) of the face image from the face image as the authentication information by a method using a subspace method or the like, for example.

The image authenticating unit 515 is a functional unit that, on the basis of the image received by the image receiver 513 and the user information registered in advance, authenticates the user contained in the image received by the image receiver 513. The image authenticating unit 515 is implemented by the computer program operated by the CPU 331 illustrated in FIG. 3, for example. The image authenticating unit 515 performs image authentication on the user contained in the image on the basis of the authentication information (the face image or the characteristic information of the face image) of the user detected by the face detector 514 in the image received by the image receiver 513 and the user information registered in advance (the user information a 520 and the user information A 506 described below, for example).

The image authenticating unit 515 permits the authentication of the user contained in the image when the user information registered in advance contains a piece of characteristic information corresponding to the characteristic information of the face image that the face detector 514 has extracted.

The image authenticating unit 515 receives the face image from the face detector 514, receives the authentication information of users registered in advance from the user information managing unit 517, and compares them against each other, for example. The image authenticating unit 515 repeats the comparison the number of times equal to the number of the users registered in the user information until the comparison succeeds. Examples of a method of comparison include a method for performing comparison between characteristic points detected in the face image and a method of comparison by pattern recognition with the luminance value of each pixel in one face image as one vector.

The image authenticating unit 515 outputs information indicating the user for which the authentication has been permitted to the apparatus authenticating unit 516. To hold the information indicating the user for which the authentication has been permitted, the image authenticating unit 515 may output the information to the storage unit 518 to store it therein.

The method of authentication by the image authenticating unit 515 is not limited to the above method, and any known face authentication technique (refer to Japanese Unexamined Patent Application Publication No. 2015-35178, for example) can be applied. The image authenticating unit 515 may perform user authentication by various known image authentication systems (fingerprint authentication, iris authentication, or vein authentication, for example) that perform user authentication on the basis of the characteristic information indicating the biometric characteristic of the user contained in the image received by the image receiver 513.

The apparatus authenticating unit 516 is a functional unit that performs login authentication (apparatus authentication) for the user on the basis of the information indicating the user for which the authentication has been permitted by the wireless authenticating unit 512 and the information indicating the user for which the authentication has been permitted by the image authenticating unit 515. When the authentication of a logged-in user has been canceled in both the wireless authentication and the image authentication, the apparatus authenticating unit 516 cancels the login authentication for the logged-in user. The apparatus authenticating unit 516 is implemented by the computer program operated by the CPU 331 illustrated in FIG. 3, for example. When the user of the wireless tag (the RFID tag 104) for which the authentication has been permitted by the wireless authenticating unit 512 and the user for which the authentication has been permitted by the image authenticating unit 515 are the same user, the apparatus authenticating unit 516 permits the use of the image forming apparatus 101 by the user. As a preferred example, when the identification information indicating the user of the wireless tag for which the authentication has been permitted by the wireless authenticating unit 512 and the identification information indicating the user for which the authentication has been permitted by the image authenticating unit 515 match each other, the apparatus authenticating unit 516 permits the use of the image forming apparatus 101 by the user.

The case in which the identification information indicating the user obtained from the wireless authenticating unit 512 and the identification information indicating the user obtained from the image authenticating unit 515 match each other can include not only a case in which the two pieces of identification information perfectly match each other but also a case in which the two pieces of identification information can be determined to be identification information indicating substantially the same user. When the identification information indicating the user obtained from the image authenticating unit 515 is an eight-digit employee ID and the identification information indicating the user obtained from the wireless authenticating unit 512 is a 10-digit login ID with two characters added to the employee ID, for example, it may be determined that the two pieces of identification information match each other. Thus, when the identification information indicating the user obtained from the wireless authenticating unit 512 and the identification information indicating the user obtained from the image authenticating unit 515 are identification information concerning the same user, the apparatus authenticating unit 516 may permit the use of the image forming apparatus 101 by the user.

In general, a result report from the wireless authenticating unit 512 is transmitted earlier. For this reason, the apparatus authenticating unit 516 may perform authentication preparation (preliminary authentication) in advance and to prepare a state in which the user can use the image forming apparatus 101 immediately after the residual authentication result has been transmitted.

The user information managing unit 517 is a functional unit that manages the user information a 520 stored in the storage unit 518. The user information managing unit 517 is implemented by the computer program operated by the CPU 331 illustrated in FIG. 3, for example.

The user information managing unit 517 provides the image authenticating unit 515 and the wireless authenticating unit 512 with the user information (the user information a 520 in FIG. 5), for example. The user information managing unit 517 sends "user number" and "authentication information" of each user to the image authenticating unit 515, for example. The user information managing unit 517 may send the pieces of information successively for each authentication processing or collectively send the pieces of information first. The user information managing unit 517 passes "user number" of the user having the wireless tag ID designated by the wireless authenticating unit 512 to the wireless authenticating unit 512, for example.

If the data designated by the wireless authenticating unit 512 is present in a cache (flash memory 334 or the like), the user information managing unit 517 acquires the data from the cache. If the data is not present in the cache, the user information managing unit 517 acquires the data from the storage unit 504 or the like of the main body 310. The user information managing unit 517 first passes the data on the cache to the image authenticating unit 515. If authentication is disabled for all the data on the cache, the user information managing unit 517 acquires the data from the storage unit 504 and sends the data of the user that is not present in the cache to the image authenticating unit 515.

The storage unit 518 is a functional unit that stores therein various kinds of information such as the user information a 520 containing the information indicating the users of the image forming apparatus 101. The storage unit 518 is implemented by the RAM 333 and the flash memory 334 illustrated in FIG. 3 and the computer program operated by the CPU 331 illustrated in FIG. 3, for example.

The communication unit 519 is a functional unit that connects the operating unit 330 to the network 360 to perform communication with the external apparatus connected to the network 360. The communication unit 519 is implemented by the communication I/F 335 illustrated in FIG. 3 and the computer program operated by the CPU 311 illustrated in FIG. 3, for example.

The wireless communication unit 511, the wireless authenticating unit 512, the image receiver 513, the face detector 514, the image authenticating unit 515, the apparatus authenticating unit 516, the user information managing unit 517, the storage unit 518, and the communication unit 519 of the operating unit 330 illustrated in FIG. 5 illustrate the functions conceptually, and this configuration is not limiting; the functional units illustrated as independent functional units in the operating unit 330 illustrated in FIG. 5 may be configured as one functional unit, for example. In contrast, the function of any one functional unit in the operating unit 330 illustrated in FIG. 5 may be divided into a plurality of functions to be configured as a plurality of functional units.

Part or the whole of wireless communication unit 511, the wireless authenticating unit 512, the image receiver 513, the face detector 514, the image authenticating unit 515, the apparatus authenticating unit 516, the user information managing unit 517 of the operating unit 330 may be implemented not by the computer program as software but by hardware circuits such as the FPGA and the ASIC.

At least a part of the functions of the operating unit 330 may be implemented within the main body 310, and reversely, at least a part of the functions of the main body 310 may be performed within the operating unit 330. The apparatus authenticating unit 516 may be included in the main body 310, for example. In this case, the other configuration is similar to the image forming apparatus 101 illustrated in FIG. 5. In this configuration, the wireless authenticating unit 512 reports the authentication result (the information indicating the user for which the authentication has been permitted, for example) of the wireless authenticating unit 512 to the apparatus authenticating unit 516 via the communication path 350. Similarly, the image authenticating unit 515 reports the authentication result (the information indicating the user for which the authentication has been permitted, for example) of the image authenticating unit 515 to the apparatus authenticating unit 516 via the communication path 350. The apparatus authenticating unit 516 performs user authentication (apparatus authentication) on the basis of the authentication result of the wireless authenticating unit 512 and the authentication result of the image authenticating unit 515 received via the communication path 350.

Configuration of User Information

FIG. 6 is a diagram of an example of user information according to the present embodiment. FIG. 7 and FIG. 8 are each a diagram of another example of the user information according to the present embodiment. The following describes the data configuration of the user information a 520 stored in the storage unit 518 of the operating unit 330 with reference to FIG. 6 to FIG. 8.

The user information a 520 illustrated in FIG. 6 is an example of the user information stored in advance. In the example in FIG. 6, the user information a 520 contains information such as "user number," "name," "e-mail address," "login ID," "login password," "wireless tag ID," and "authentication information."

"User number" is a serial number numbered when the information of each user is registered in the user information a 520 or an identification number unique to each data of the user, for example, and is an example of identification information unique to each user (identification information indicating the user). "User number" may be identification information indicating the user such as an employee ID, for example.

"Name" is the name of the user. "E-mail address" is the e-mail address of the user. "Login ID" and "login password" are examples of the authentication information for the user to log in to the image forming apparatus 101.

"Wireless tag ID" is identification information such as a tag ID indicating the RFID tag 104 transmitted by the RFID tag 104 that each user carries and is represented by an eight-digit number, for example. "Wireless tag ID" is an example of the certain information transmitted from the RFID tag 104, in which the certain information may contain information other than number, that is, identification information indicating the user, for example.

"Authentication information" is characteristic information concerning the face of the user such as the shape, the relative position, and the like of various parts such as a face outline, an eye, a nose, a chin, and a cheekbone of the user of the image forming apparatus 101. "Authentication information" is required to be acquired for each user in advance and to be registered in the user information a 520.

The user information a 520 illustrated in FIG. 6 stores therein pieces of information in association with each other; when the data type is "Data 2," for example, the user number is "101002," the name is "BBBB," the e-mail address is "bbb@bbb.ccc," the login ID is "BB_BB," the login password is "abcdef," the wireless tag ID is "00535213," and the authentication information is "{56, 111, −3, ..., −120, 47, 208}."

The storage unit 518 of the operating unit 330 can store therein about 300 to 1,800 pieces of user information a 520 as illustrated in FIG. 6, for example. The user information managing unit 517 of the operating unit 330 stores at least a part of the user information A 506 stored in the storage unit 504 of the main body 310 in the storage unit 518 of the operating unit 330 as the user information a 520, for example. With this processing, the wireless authenticating unit 512 and the image authenticating unit 515 can read the user information a 520 stored in the storage unit 518 of the operating unit 330 faster than the user information A 506 stored in the storage unit 504 of the main body 310.

The storage unit 518 may store therein user information 701 illustrated in FIG. 7 or user information 801 illustrated in FIG. 8 in addition to or in place of the user information a 520. The user information 701 illustrated in FIG. 7 stores therein "wireless tag ID" described above and "user ID," which is an example of the identification information indicating the user, in association with each other. The wireless authenticating unit 512 can authenticate (wirelessly authenticate) the RFID tag 104 so long as at least the information listed in the user information 701 is present. When the user information 701 contains the wireless tag ID of the RFID tag 104 that the wireless communication unit 511 has received, for example, the wireless authenticating unit 512 permits the authentication of the RFID tag 104 and outputs the user ID corresponding to the RFID tag 104 for which the authentication has been permitted to the apparatus authenticating unit 516 and the like.

The user information 801 illustrated in FIG. 8 stores therein "user ID" and "authentication information" described above in association with each other. The image authenticating unit 515 can authenticate (image authenticate) the user contained in the image so long as at least the information listed in the user information 801 is present. When the user information 801 contains a piece of characteristic information corresponding to the characteristic information of the face image of the user extracted by the face detector 514, for example, the image authenticating unit 515 permits the authentication of the user contained in the image and outputs the user ID of the user for which the authentication has been permitted to the apparatus authenticating unit 516 and the like.

Although the pieces of user information a 520, 701, and 801 illustrated in FIG. 6 to FIG. 8 are all pieces of tabular information, this is not limiting; they may be any type of information so long as the values of the respective fields can be managed in association with each other.

Procedure of Wireless Authentication Processing

Figure 9:
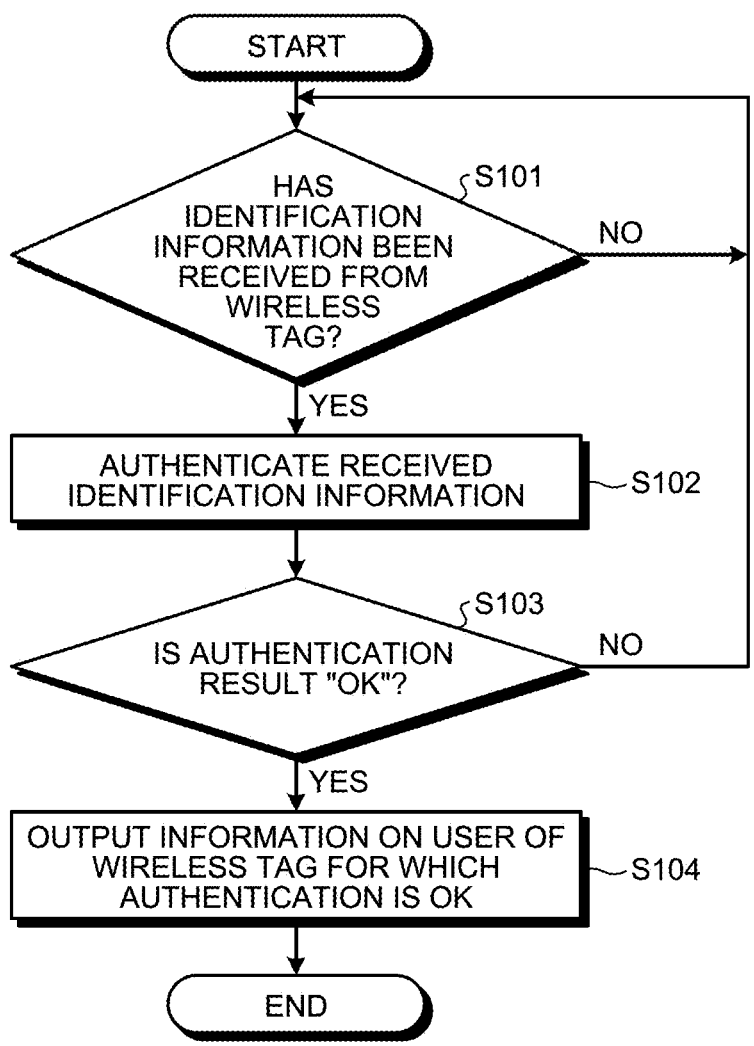
FIG. 9 is a flowchart of an example of wireless authentication processing by the image forming apparatus according to the embodiment.

FIG. 9 is a flowchart of an example of wireless authentication processing by the image forming apparatus according to the present embodiment. The following describes a procedure of the wireless authentication processing by the image forming apparatus 101 according to the present embodiment with reference to FIG. 9.

Step S101

First, the wireless communication unit 511 receives identification information (a wireless tag ID) from a wireless tag (the RFID tag 104) within a certain range (the detection range 252 illustrated in FIG. 2, for example). If the wireless communication unit 511 receives the identification information (Yes at Step S101), the process advances to Step S102; if the identification information fails to be received (No at Step S101), the reception is performed again.

Step S102

The wireless authenticating unit 512 authenticates the wireless tag (the RFID tag 104) that has transmitted the certain information on the basis of the identification information that the wireless communication unit 511 has received and the user information registered in advance. Specifically, the wireless authenticating unit 512 authenticates (wirelessly authenticates) the RFID tag 104 on the basis of the wireless tag ID of the RFID tag 104 that the wireless communication unit 511 has received and the user information a 520 and the user information A 506 registered in advance. If the user information a 520 or the user information A 506 contains the wireless tag ID of the RFID tag 104 that the wireless communication unit 511 has received, the wireless authenticating unit 512 permits the authentication of the RFID tag 104. If the user information a 520 or the user information A 506 does not contain the wireless tag ID that the wireless communication unit 511 has received, the wireless authenticating unit 512 does not permit the authentication of the RFID tag 104. The process then advances to Step S103.

Step S103

As a result of the wireless authentication by the wireless authenticating unit 512, if the authentication of the RFID tag 104 is permitted (if the authentication result is "OK") (Yes at Step S103), the process advances to Step S104. In contrast, if the authentication of the RFID tag 104 is not permitted (if the authentication result is not "OK") (No at Step S103), the process returns to Step S101, and similar processing is repeated.

Step S104

The wireless authenticating unit 512 outputs information (the user identification information of the user such as "user number" or "user ID," for example) on the user of the RFID tag 104 for which the authentication has been permitted (for which the authentication result is "OK", i.e., indicating acceptable) to the apparatus authenticating unit 516. In this process, the wireless authenticating unit 512 may output information indicating that the authentication has been permitted (that the authentication result is "OK") together with the identification information of the user of the RFID tag 104 for which the authentication has been permitted to the apparatus authenticating unit 516. If the authentication is not permitted at Step S103, the wireless authenticating unit 512 may output information indicating that the authentication has not been permitted (that the authentication result is "NG", i.e., indicating unacceptable) to the apparatus authenticating unit 516.

With the operations at Steps S101 to S104, the wireless authentication processing is executed by the image forming apparatus 101.

Procedure of Image Authentication Processing

Figure 10:
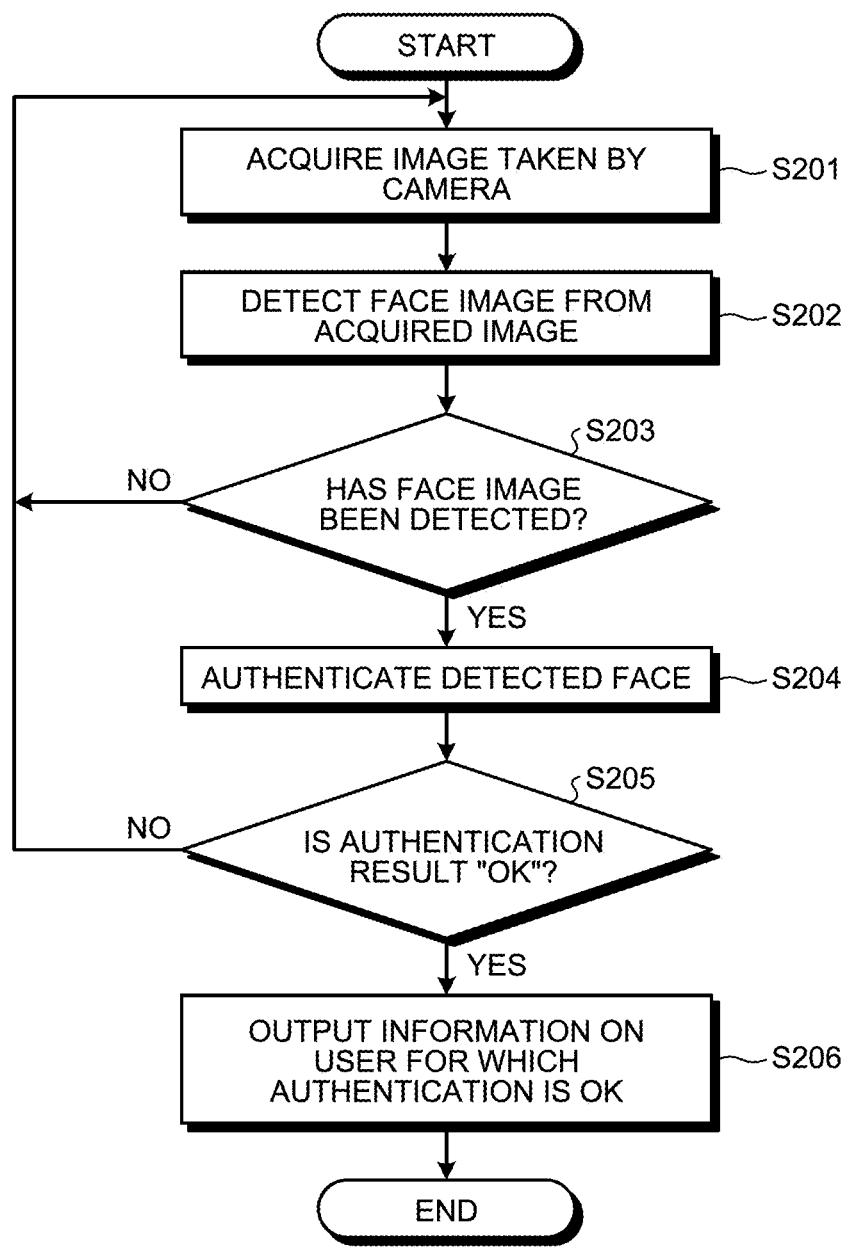
FIG. 10 is a flowchart of an example of image authentication processing by the image forming apparatus according to the embodiment.
Figure 11:
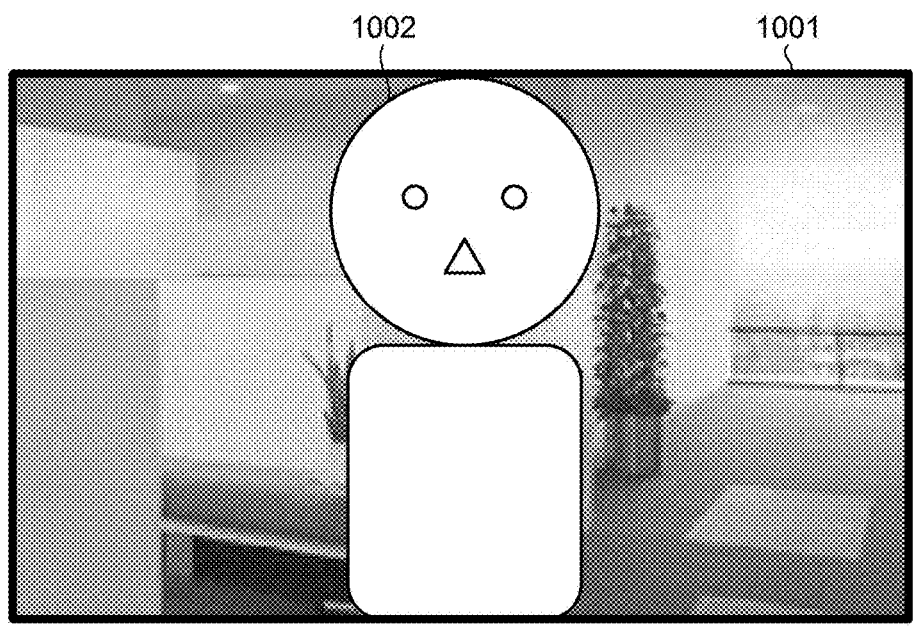
FIG. 11 is a diagram for explaining an example of image authentication according to the embodiment.
Figure 12:
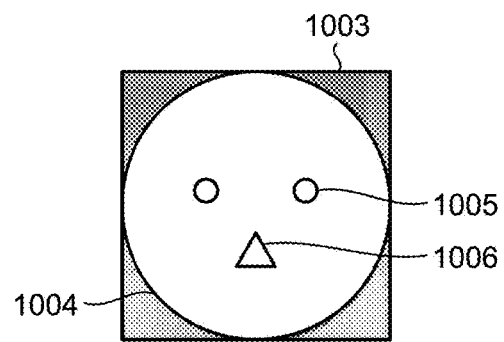
FIG. 12 is a diagram for explaining an example of the image authentication according to the embodiment.

FIG. 10 is a flowchart of an example of image authentication processing by the image forming apparatus according to the embodiment. FIG. 11 and FIG. 12 are diagrams for illustrating an example of image authentication according to the present embodiment. The following describes a procedure of the image authentication processing by the image forming apparatus 101 according to the present embodiment with reference to FIG. 10 to FIG. 12.

Step S201

The image receiver 513 acquires a taken image taken by the camera 340. FIG. 11 illustrates an example of the taken image acquired in this process. A taken image 1001 illustrated in FIG. 11 contains a user 1002 present in front of the image forming apparatus 101. The camera 340 is thus installed such that the user present in front of the image forming apparatus 101 will be contained in the taken image 1001. The process then advances to Step S202.

Step S202

The face detector 514 detects an image of a face part (a face image) from the taken image acquired by the image receiver 513. FIG. 12 illustrates an example of the detected face image in this process. The face detector 514 extracts parts such as a face outline 1004, an eye 1005, and a nose 1006 of the user from the taken image 1001 taken by the camera 340, for example, and detects a face image 1003 of the user using a known pattern matching technique, for example. The process then advances to Step S203.

Step S203

If the face detector 514 has detected the face image 1003 in the taken image 1001 (Yes at Step S203), the process advances to Step S204. In contrast, if the face detector 514 has not detected the face image 1003 in the taken image 1001 (No at Step S203), the process returns to Step S201, and similar processing is repeated.

Step S204

The image authenticating unit 515 performs authentication (the image authentication) using the detected face image. For the processing of the image authentication, various known face authentication techniques (refer to Japanese Unexamined Patent Application Publication No. 2015-35178 described above, for example) can be applied. The following describes an example only briefly.

"Authentication information" of the user information a 520 and the user information A 506 contains information on the shape, the relative position, and the like of various parts such as a face outline, an eye, a nose, a chin, and a cheekbone acquired in advance for each user for which the use of the image forming apparatus 101 has been permitted, for example. The face detector 514 detects the face image 1003 contained in the taken image 1001 that the image receiver 513 has acquired and extracts the characteristic information of the user from the detected face image 1003. The image authenticating unit 515 compares the characteristic information of the user extracted by the face detector 514 with each piece of "authentication information" of the user information a 520 or the user information A 506 and determines whether the user contained in the taken image 1001 is a user who has been registered in the user information a 520 or the user information A 506. If it determines that the user contained in the taken image 1001 is the user who has been registered in the user information a 520 or the user information A 506, the image authenticating unit 515 permits the authentication of the user contained in the taken image 1001. In contrast, if it determines that the user contained in the taken image 1001 is not the user who has been registered in the user information a 520 or the user information A 506, the image authenticating unit 515 does not permit the authentication of the user contained in the taken image 1001. The process then advances to Step S205.

Step S205

As a result of the image authentication by the image authenticating unit 515, if the authentication of the user is permitted (if the authentication result is "OK") (Yes at Step S205), the process advances to Step S206. In contrast, if the authentication of the user is not permitted (if the authentication result is not "OK") (No at Step S205), the process returns to Step S201, and similar processing is repeated.

Step S206

The image authenticating unit 515 outputs information (the identification information of the user such as "user number" or "user ID," for example) on the user for which the authentication has been permitted (for which the authentication is "OK") to the apparatus authenticating unit 516. In this process, the image authenticating unit 515 may output information indicating that the authentication has been permitted (that the authentication result is "OK") together with the identification information of the user for which the authentication has been permitted to the apparatus authenticating unit 516. If the authentication is not permitted at Step S205, the image authenticating unit 515 may output information indicating that the authentication has not been permitted (that the authentication result is "NG", indicating unacceptable) to the apparatus authenticating unit 516.

With the operations at Steps S201 to S206, the image authentication processing is executed by the image forming apparatus 101.

Procedure of Hybrid Authentication Processing

Figure 13:
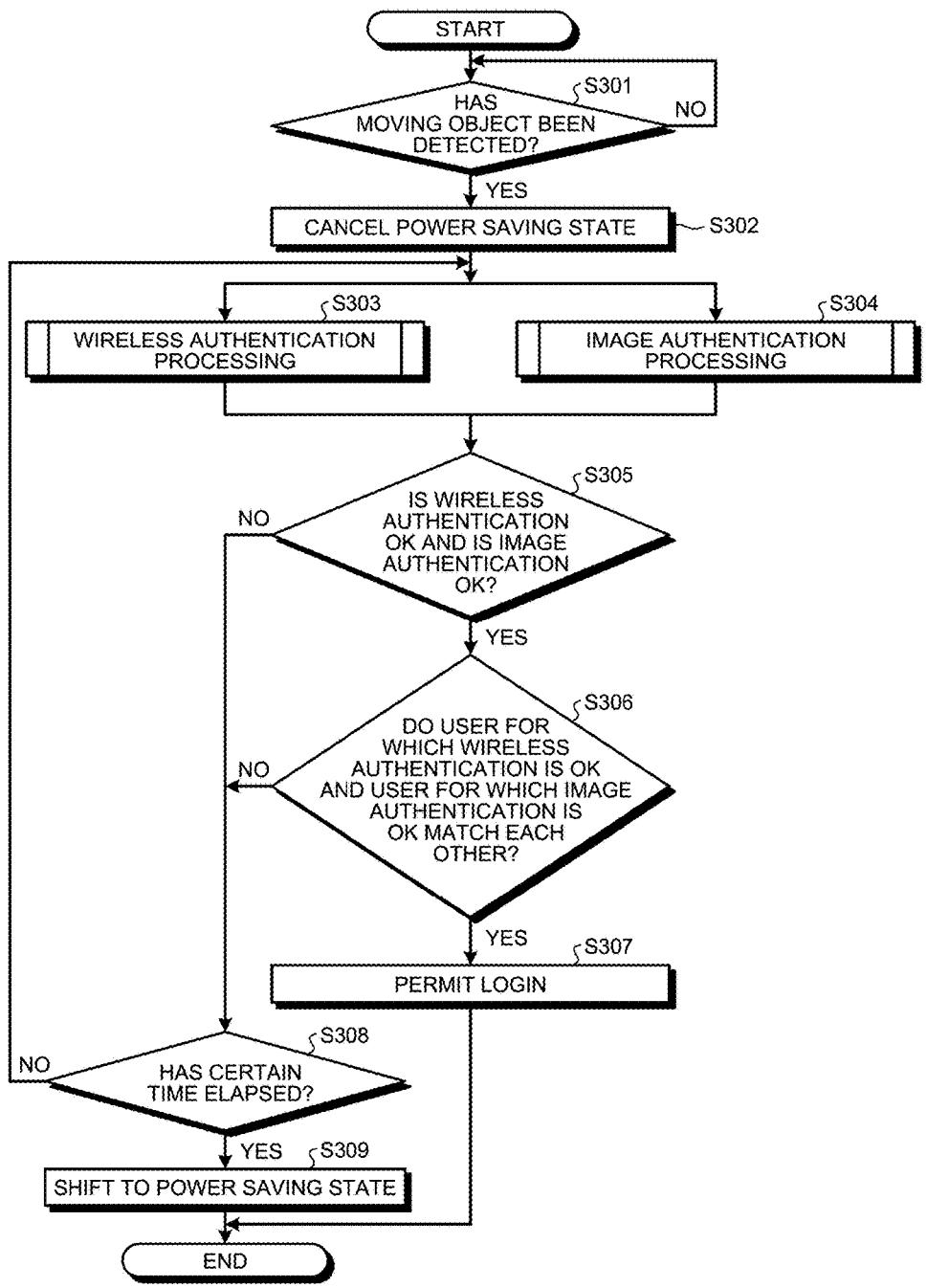
FIG. 13 is a flowchart of an example of authentication processing by the image forming apparatus according to the embodiment.

FIG. 13 is a flowchart of an example of authentication processing by the image forming apparatus according to the present embodiment. The following describes a procedure of the hybrid authentication processing by the image forming apparatus 101 according to the present embodiment with reference to FIG. 13. It is assumed that at the starting point in time of the hybrid authentication processing illustrated in FIG. 13, the image forming apparatus 101 is controlled to be in the above-mentioned power saving state by the electric power state controller 502.

Step S301

If a moving object (a person, for example) around the image forming apparatus 101 has been detected by the moving object detector 501 of the main body 310 (Yes at Step S301), the process advances to Step S302. If no moving object has been detected (No at Step S301), the moving object detector 501 continues the moving object detection operation.

Step S302

The electric power state controller 502 of the main body 310 cancels the power saving state of the operating unit 330. The electric power state controller 502 reports a return instruction to the operating unit 330 via the communication path 350, thereby returning the operating unit 330 from the power saving state to the normal state, for example. The electric power state controller 502 transmits power-on to the image receiver 513, the wireless communication unit 511, and the apparatus authenticating unit 516, for example. This processing enables the wireless authentication processing by the wireless authenticating unit 512 illustrated in FIG. 9 and the image authentication processing by the image authenticating unit 515 illustrated in FIG. 10 to be executed. The process then advances to Step S303 and Step S304.

Step S303

The wireless communication unit 511 and the wireless authenticating unit 512 of the operating unit 330 perform the wireless authentication processing as illustrated in FIG. 9, for example. If it permits the authentication of the RFID tag 104 by the wireless authentication processing, the wireless authenticating unit 512 outputs information indicating that the authentication result of the wireless authentication processing is "OK" and the identification information ("user number" in FIG. 6, for example) of the user of the RFID tag 104 for which the authentication has been permitted to the apparatus authenticating unit 516. In contrast, if it does not permit the authentication of the RFID tag 104 by the wireless authentication processing, the wireless authenticating unit 512 outputs information indicating that the authentication result of the wireless authentication processing is "NG", which indicates unacceptable, to the apparatus authenticating unit 516. The process advances to Step S305.

Step S304

The image receiver 513, the face detector 514, and the image authenticating unit 515 of the operating unit 330 perform the image authentication processing as illustrated in FIG. 10, for example. If it permits the authentication of the user contained in the taken image by the image authentication processing, the image authenticating unit 515 outputs information indicating that the processing result of the image authentication processing is "OK" and the identification information ("user number" in FIG. 6, for example) of the user for which the authentication has been permitted to the apparatus authenticating unit 516. In contrast, if it does not permit the authentication of the user contained in the taken image by the image authentication processing, the image authenticating unit 515 outputs information indicating that the processing result of the image authentication processing is "NG", which indicates unacceptable, to the apparatus authenticating unit 516. The process then advances to Step S305.

Step S305

The apparatus authenticating unit 516 determines whether the result of the wireless authentication processing is "OK" and the result of the image authentication processing is "OK" (permission) on the basis of the pieces of information output from the wireless authenticating unit 512 and the image authenticating unit 515. If both the result of the wireless authentication processing and the result of the image authentication processing are "OK" (permission) (Yes at Step S305), the process advances to Step S306. In contrast, if either the result of the wireless authentication processing or the result of the image authentication processing is not "OK" (permission) (No at Step S305), the process advances to Step S308.

Step S306

The apparatus authenticating unit 516 determines whether the user of the RFID tag 104 for which the result of the wireless authentication processing is "OK" at Step S303 and the user for which the result of the image authentication processing is "Ok" at Step S304 are the same user. The apparatus authenticating unit 516 determines whether the identification information of the user output from the wireless authenticating unit 512 and the identification information of the user output from the image authenticating unit 515 match each other, for example. If the identification information of the user output from the wireless authenticating unit 512 and the identification information of the user output from the image authenticating unit 515 match each other (Yes at Step S306), the process advances to Step S307. In contrast, if the identification information of the user output from the wireless authenticating unit 512 and the identification information of the user output from the image authenticating unit 515 do not match each other (No at Step S306), the process advances to Step S308. Specific examples of a case in which the pieces of identification information of the users do not match each other include a case in which a user who carries the RFID tag 104 is passing by the image forming apparatus 101, and a registered user who does not carry the RFID tag 104 is present in front of the image forming apparatus 101.

Step S307

If it determines that the identification information of the user output from the wireless authenticating unit 512 and the identification information of the user output from the image authenticating unit 515 match each other, the apparatus authenticating unit 516 permits the login authentication (the apparatus authentication) of the user to the image forming apparatus 101. With this processing, the user becomes able to use the image forming apparatus 101.

Step S308

The electric power state controller 502 determines whether a certain period of time (5 minutes, for example) has elapsed after the cancellation of the power saving state of the operating unit 330 at Step S302. If the certain period of time has elapsed, that is, if the apparatus authentication by the apparatus authenticating unit 516 does not succeed within the certain period of time (Yes at Step S308), the process advances to Step S309. In contrast, if the certain period of time has not elapsed (No at Step S308), the process returns to Steps S303 and S304, and similar processing is repeated.

Step S309

The electric power state controller 502 shifts the operating unit 330 to the power saving state. The electric power state controller 502 reports a shift instruction to the operating unit 330 via the communication path 350, thereby shifting the operating unit 330 from the normal state to the power saving state, for example.

With the operations at Steps S301 to S309, the apparatus authentication processing is executed by the image forming apparatus 101.

Procedure of Logout Processing

Figure 14:
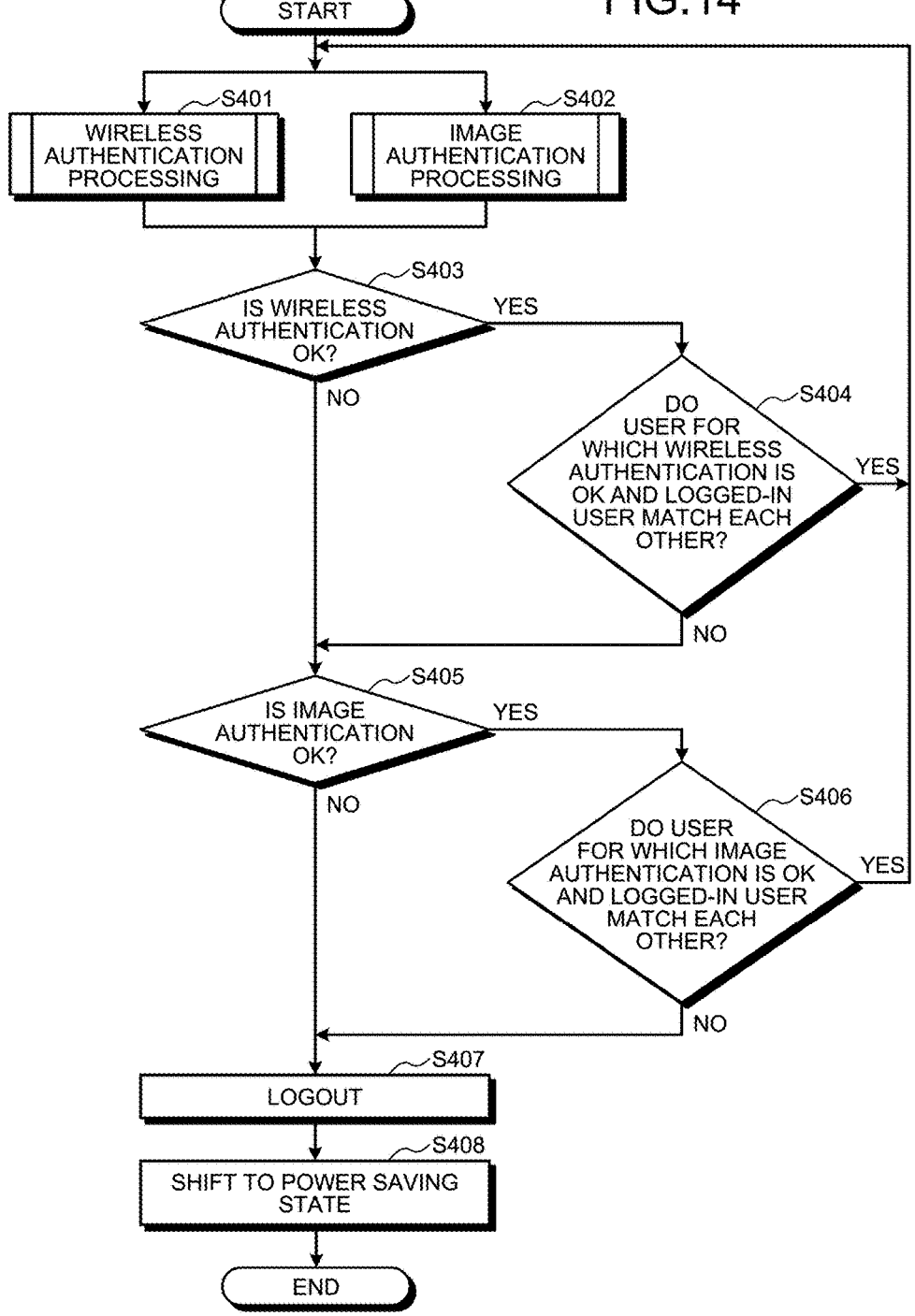
FIG. 14 is a flowchart of an example of logout processing by the image forming apparatus according to the embodiment.

FIG. 14 is a flowchart of an example of logout processing by the image forming apparatus according to the embodiment. The following describes a procedure of the logout processing by the image forming apparatus 101 according to the present embodiment with reference to FIG. 14. The logout processing is processing for performing login by the hybrid authentication of the wireless authentication and the image authentication and performing logout immediately after the end of use. It is assumed that at the starting point in time of the logout processing illustrated in FIG. 14, a user has logged in thereto.

Step S401 and Step S402

After login, the wireless authentication processing at Step S401 and the image authentication processing at Step S402 are executed simultaneously. Step S401 and Step S402 are similar to Step S303 and Step S304, respectively, in FIG. 13, and descriptions thereof will be omitted.

Step S403

The apparatus authenticating unit 516 determines whether the result of the wireless authentication processing is "OK" on the basis of information output from the wireless authenticating unit 512. If the result of the wireless authentication processing is not "OK" (No at Step S403), the process advances to Step S405. If the result of the wireless authentication processing is "OK" (Yes at Step S403), the process advances to Step S404.

Step S404

The apparatus authenticating unit 516 determines whether the user for which the wireless authentication is OK and the currently logged-in user match each other. If the user for which the wireless authentication is OK and the currently logged-in user match each other (Yes at Step S404), the process again returns to Step S401 and Step S402 and the login continues. If the user for which the wireless authentication is OK and the currently logged-in user do not match each other (No at Step S404), the process advances to Step S405.

Step S405

The apparatus authenticating unit 516 determines whether the result of the image authentication processing is "OK" on the basis of information output from the image authenticating unit 515. If the result of the image authentication processing is not "OK" (No at Step S405), the process advances to Step S407. If the result of the image authentication processing is "OK" (Yes at Step S405), the process advances to Step S406.

Step S406

The apparatus authenticating unit 516 determines whether the user for which the image authentication is OK and the currently logged-in user match each other. If the user for which the image authentication is OK and the currently logged-in user match each other (Yes at Step S406), the process again returns to Step S401 and Step S402 and the login continues. If the user for which the image authentication is OK and the currently logged-in user do not match each other (No at Step S406), the process advances to Step S407.

Step S407

The apparatus authenticating unit 516 logs out the logged-in user, and the process advances to Step S408.

Step S408

The apparatus authenticating unit 516 shifts the image forming apparatus 101 from the normal state to the power saving state.

With the method described above, when the authentication of the logged-in user has been cancelled in both the image authentication and the wireless authentication, the apparatus authenticating unit 516 can log out the logged-in user. The cancellation of the authentication of the logged-in user includes a case in which there is no authenticated user (No at Step S403 and No at Step S405, for example) and a case in which the authenticated user does not match the logged-in user (No at Step S404 and No at Step S406, for example). This processing can prevent, after the end of use by the user, as-is use by another user. Furthermore, erroneous logout simply by temporal inability of image authentication such as when the user is about to pick up a dropped object can be prevented.

Examples of Login and Logout

Figure 15:
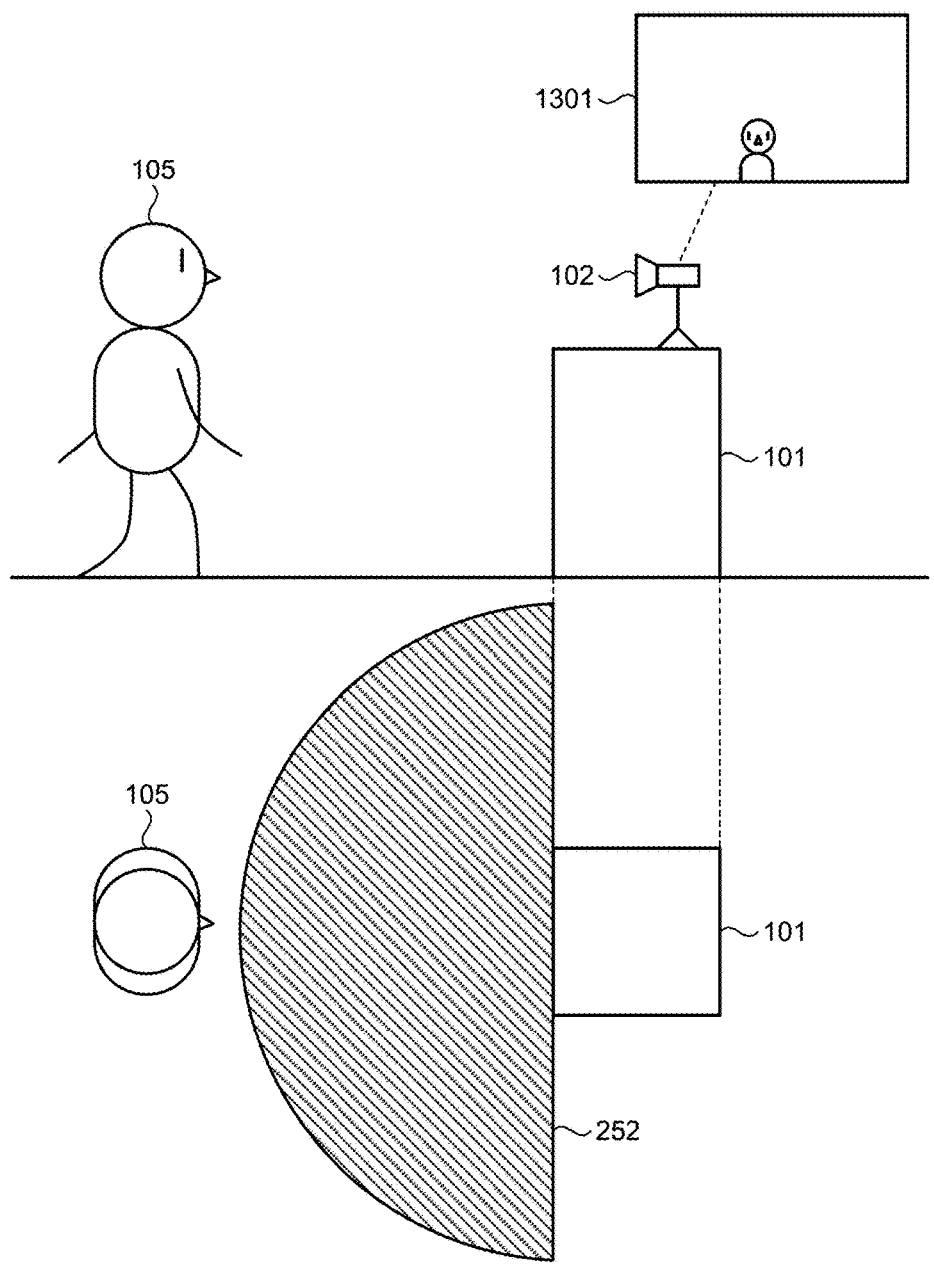
FIG. 15 is a diagram of an example of an authenticated state of wireless authentication and image authentication.

FIG. 15 is a diagram of a state in which the user is not being authenticated in both the wireless authentication and the image authentication. FIG. 15 is an example of a state in which the user 105 is present at a position remote from the image forming apparatus 101, and the user 105 is not authenticated in both the wireless authentication and the image authentication. An image 1301 schematically illustrates an example of an image taken by the camera 102. In the image 1301, the size of the face of the user is relatively small, and the image authentication is not permitted. In addition, the user 105 is present outside the detection range 252, and the wireless authentication is not permitted, either.

Figure 16:
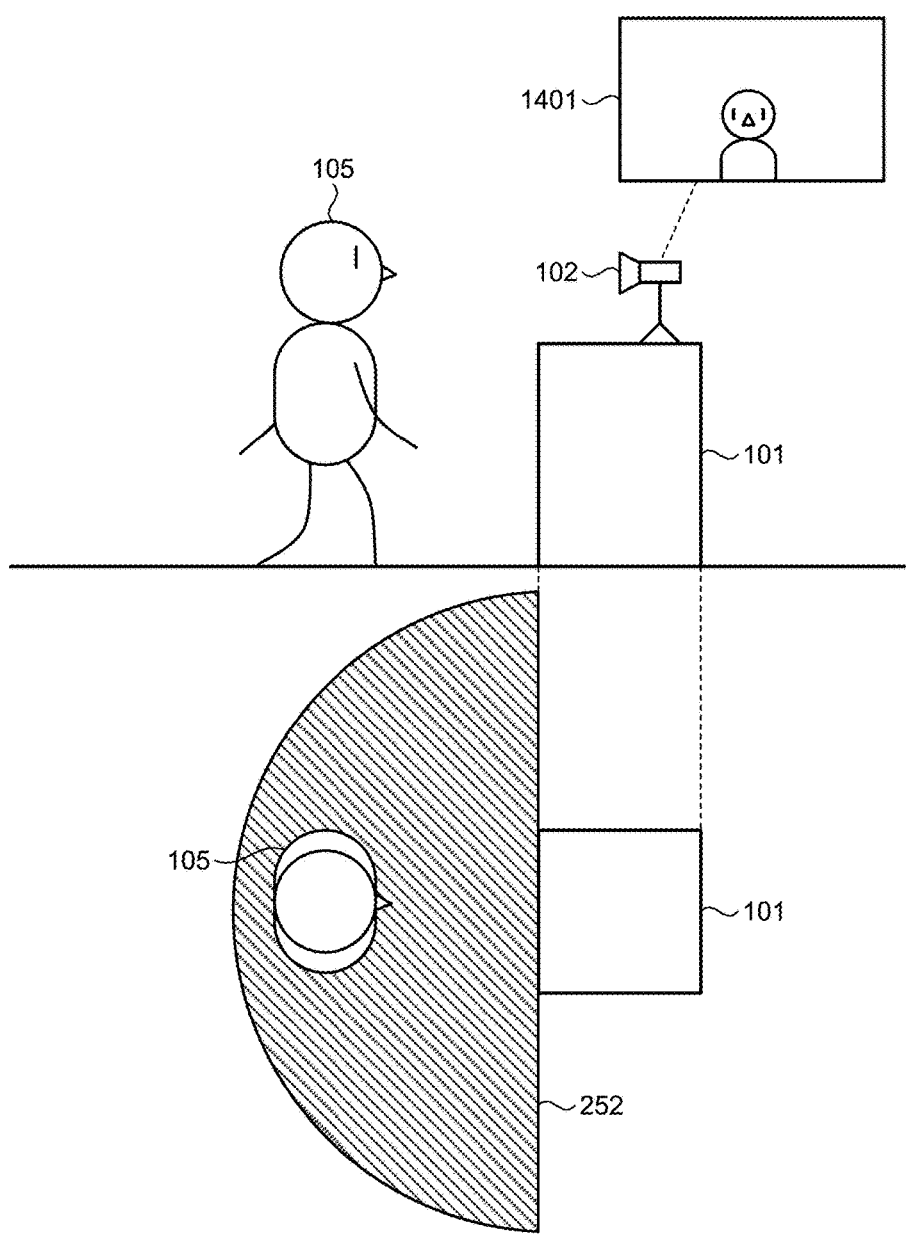
FIG. 16 is a diagram of an example of the authenticated state of the wireless authentication and the image authentication.

FIG. 16 is a diagram of a state in which the user is authenticated in the wireless authentication, whereas the user is not authenticated in the image authentication. In FIG. 16, the user 105 has entered the detection range 252, and the wireless authentication is permitted. In contrast, the size of the face of the user is not sufficiently large as illustrated in an image 1401, and the image authentication is not permitted.

Figure 17:
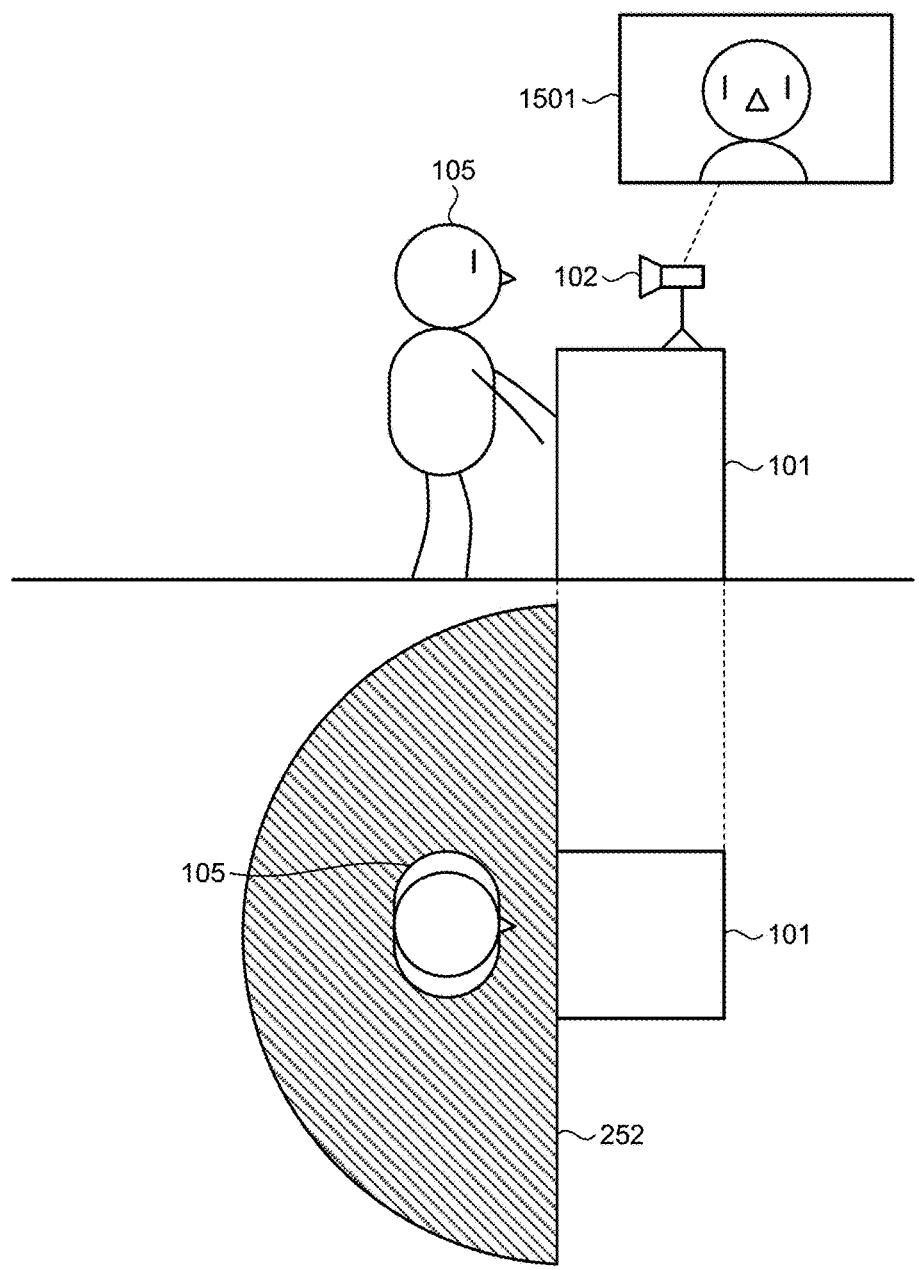
FIG. 17 is a diagram of an example of the authenticated state of the wireless authentication and the image authentication.

FIG. 17 is a diagram of a state in which the user has been authenticated in both the wireless authentication and the image authentication. In FIG. 17, the user 105 has further approached the image forming apparatus 101, and the face of the user 105 is imaged in a size large enough to be detected within an image 1501. With this processing, the user 105 is authenticated in both the wireless authentication and the image authentication. This state corresponds to the starting point in time of the flow in FIG. 14.

Figure 18:
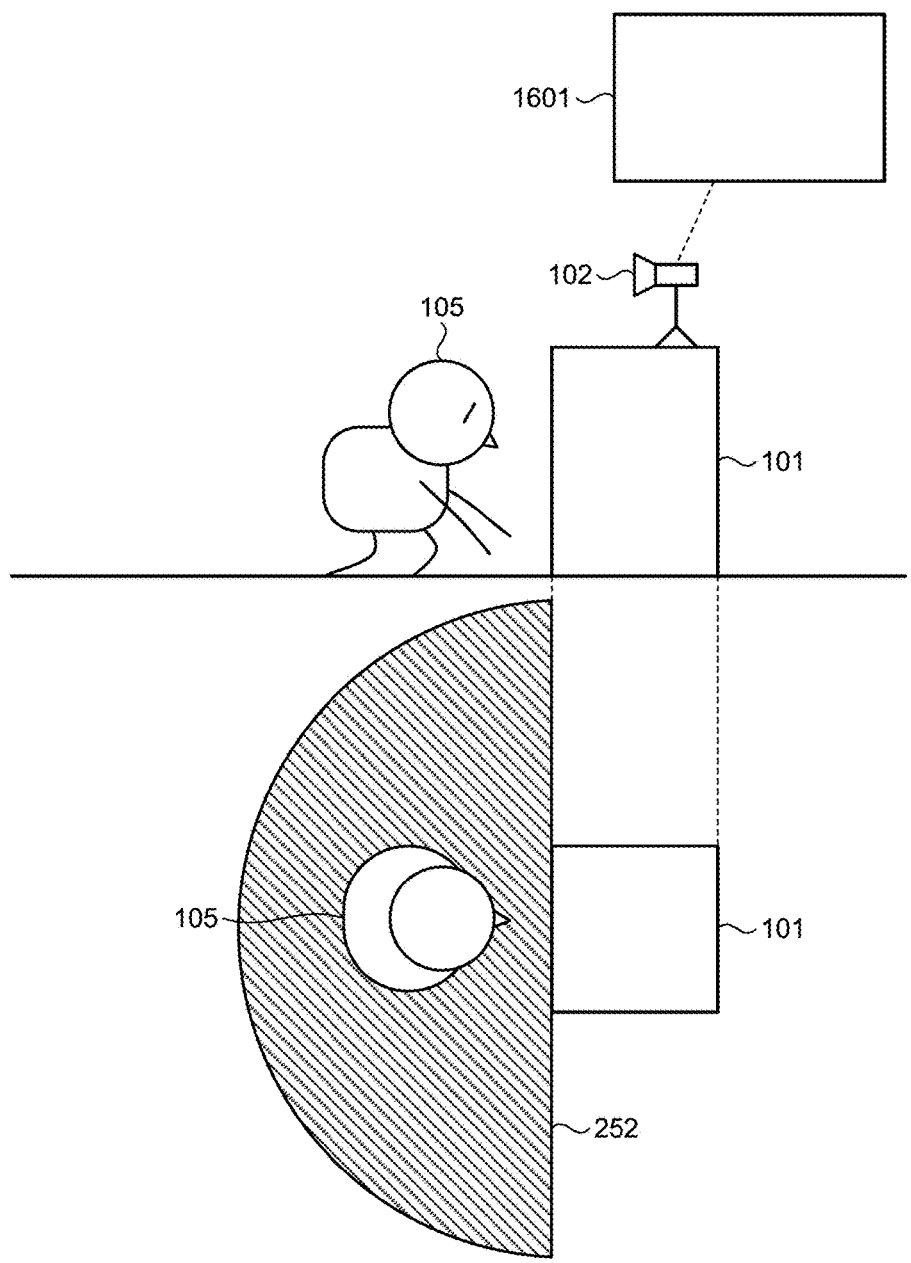
FIG. 18 is a diagram of an example of the authenticated state of the wireless authentication and the image authentication.

FIG. 18 is a diagram of a state in which the authentication by the wireless authentication continues, whereas the user can no longer be authenticated in the image authentication. In FIG. 18, the user 105 has entered the detection range 252, and the wireless authentication is permitted. In contrast, the user 105 is present at a position that is not imaged by the camera 102 as illustrated in an image 1601, thus the user 105 is not authenticated in the image authentication. In the flow in FIG. 14, even in this state, "Yes" is determined at Step S404, and the user 105 is not logged out.

Figure 19:
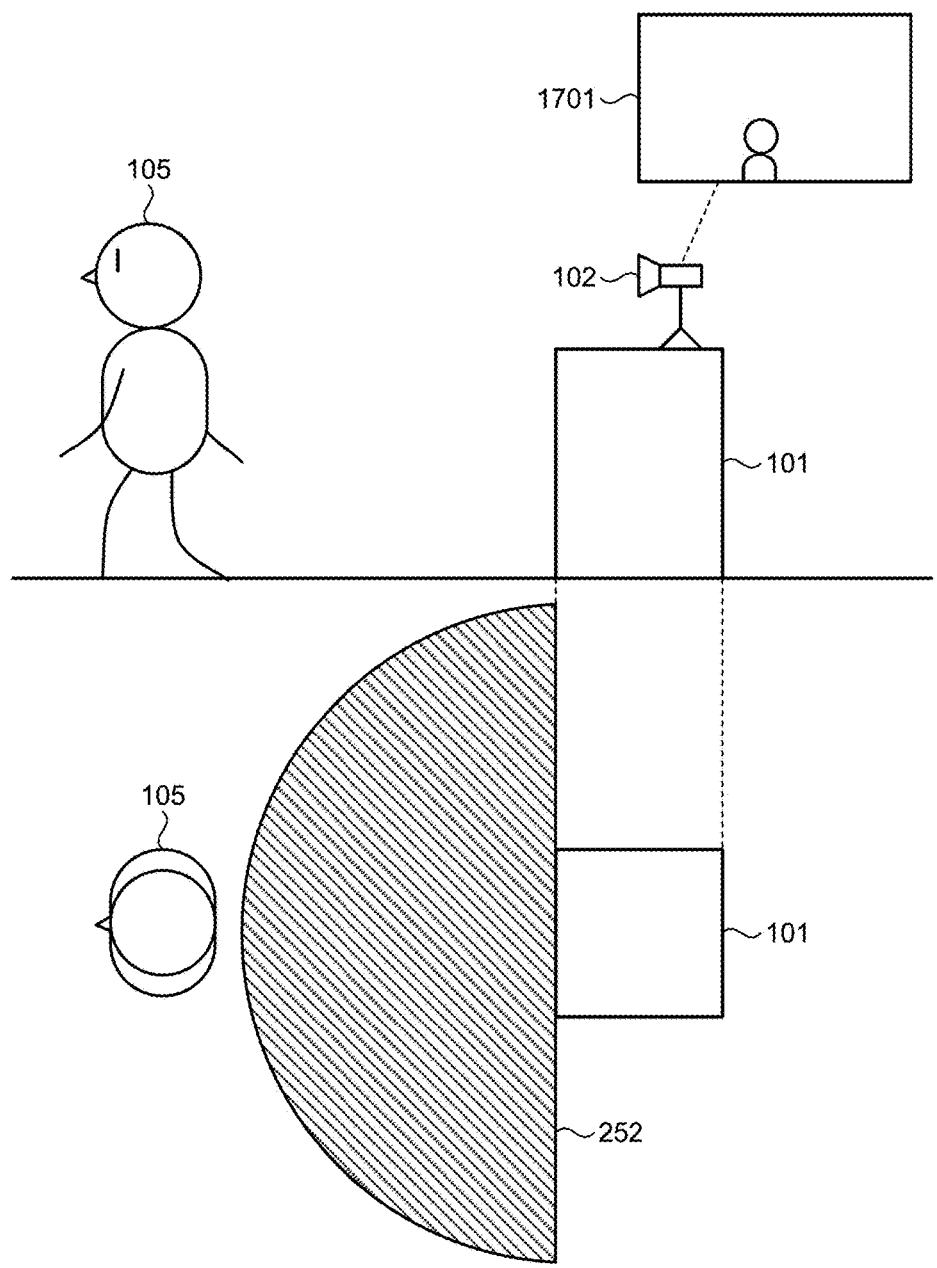
FIG. 19 is a diagram of an example of the authenticated state of the wireless authentication and the image authentication.

FIG. 19 is a diagram of a state in which the user can no longer be authenticated in both the wireless authentication and the image authentication. FIG. 19 illustrates a state in which the user 105 has ended the use of the image forming apparatus 101 and has left the image forming apparatus 101. In this state, the user 105 is present outside the detection range 252. The face of the user 105 is imaged in a smaller size within an image 1701. Consequently, the user 105 can no longer be authenticated in both the wireless authentication and the image authentication. In the flow in FIG. 14, in this state, "No" is determined at both Step S403 and Step S405, and the user is logged out.

Modification

In the embodiment described above, the apparatus authentication is canceled when the authentication is cancelled in both the wireless authentication and the image authentication. With this procedure, the end of use is not necessarily able to be appropriately determined. For example, when the area of the wireless authentication (3 meters of the detection range of the RFID, for example) is wider than the area of the image authentication (0.6 meter of the imaging range of an image, for example), considering security, it is desired that the apparatus authentication be logged out when the face has departed from the imaging range. However, in the method according to the embodiment described above, the apparatus authentication cannot be logged out and the login continues unless the user 105 walks out of the detection range of the RFID.

Given this situation, in the present modification, when the authentication of the image authentication is canceled, the apparatus authentication is canceled. When after the apparatus authentication is canceled, the wireless authentication is maintained for a certain period of time, and the face is again detected within the imaging range (within a face image recognition range), the apparatus authentication is permitted on the basis of the wireless authentication result and the second image authentication result. With this procedure, reauthentication can be speeded up when the user has been temporarily out of the range of the image authentication such as when the user is about to pick up a dropped object.

When the area of the wireless authentication is wider than the area of the image authentication, for example, the apparatus authentication may be canceled upon cancellation of the wireless authentication In other words, the apparatus authentication may be canceled when any authentication processing among a plurality of pieces of authentication processing has been canceled.

FIG. 20 is a flowchart of an example of authentication processing of the modification. The flowchart in FIG. 20 is started with both the wireless authentication and the image authentication permitted and with the apparatus authentication permitted, for example.

The image authenticating unit 515 determines whether there is a face image within an imaging range (Step S501). If there is a face image (Yes at Step S501), the determination processing at Step S501 is repeated. If there is no face image (No at Step S501), the image authenticating unit 515 determines whether a certain period of time (5 seconds, for example) has elapsed (Step S502). If the certain period of time has not elapsed (No at Step S502), the determination processing at Step S502 is repeated. If the certain period of time has elapsed (Yes at Step S502), the image authenticating unit 515 cancels the image authentication, and along therewith, the apparatus authenticating unit 516 cancels the apparatus authentication (Step S503).

The image authenticating unit 515 determines whether a certain period of time (5 seconds, for example) has further elapsed (Step S504). If the certain period of time has not elapsed (No at Step S504), the image authenticating unit 515 determines whether there is a face image within the imaging range (Step S505). If there is no face image (No at Step S505), the image authenticating unit 515 returns to Step S504 and repeats the processing. If there is a face image (Yes at Step S505), the image authenticating unit 515 executes the image authentication processing using the face image detected within the imaging range (Step S506). This image authentication processing is similar to Step S204 in FIG. 10, for example. The image authenticating unit 515 may start the image authentication processing starting from the same user information as that of the last authenticated object. With this processing, the authentication processing can be executed at a higher speed.

The image authenticating unit 515 determines whether the image authentication has succeeded (Step S507). If the image authentication has succeeded (Yes at Step S507), the image authenticating unit 515 determines whether the authenticated user is the same as the last authenticated user (Step S508). If the authenticated user is the same as the last authenticated user (Yes at Step S508), the apparatus authenticating unit 516 permits the apparatus authentication using the information on the wireless authentication for which the permission is currently maintained (Step S509) and ends the authentication processing. With this processing, the once cancelled apparatus authentication can be permitted again at a higher speed.

The apparatus authenticating unit 516 cancels the wireless authentication (Step S510) to end the authentication processing if it is determined that the certain period of time has elapsed at Step S504 (Yes at Step S504), if it is determined that the image authentication has not succeeded at Step S507 (No at Step S507), or if it is determined that the authenticated use is not the same as the last authenticated user at Step S508 (No at Step S508). After that, the authentication processing based on the results of both the wireless authentication and the image authentication is resumed as illustrated in FIG. 13, for example.

Supplement to Embodiments

The functional configuration of the image forming apparatus 101 described in the embodiments is an example, and the functional units may be installed in the main body 310 or installed in the operating unit 330.

In the embodiments, although the main body 310 and the operating unit 330 operate independently of each other on separate operating systems, this is not limiting; the main body 310 and the operating unit 330 may operate on the same operating system, for example.

In the embodiments, when at least one of the functional units of the image forming apparatus 101 is implemented by the execution of a computer program, the computer program is embedded and provided in a ROM, for example. The computer program executed by the image forming apparatus 101 according to the embodiments may be recorded and provided on a computer-readable recording medium such as a compact disc read only memory (CD-ROM), a flexible disk (FD), a compact disc recordable (CD-R), or a digital versatile disc (DVD), as an installable or executable file. The computer program executed by the image forming apparatus 101 according to the embodiments may be stored in a computer connected to a network such as the Internet and provided by being downloaded via the network. The computer program executed by the image forming apparatus 101 according to the embodiments may be provided or distributed via a network such as the Internet. The computer program executed by the image forming apparatus 101 according to the embodiments is modularized including at least one of the functional units, and as actual hardware, the CPU 311 or the CPU 331 reads the computer program from the storage device (the ROM 312, the ROM 332, the storage 314, the flash memory 334, or the like) and executes it, thereby causing the functional units to be loaded to a main storage device (the RAM 313, the RAM 333, or the like) and to be generated.

The present invention can reduce erroneous recognition of the end of use.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
   a first authenticator configured to perform a wireless authentication based on a short-range wireless tag of a user;

a second authenticator configured to perform an image authentication based on one or more biometric characteristics of the user; and an apparatus authenticator configured to perform login processing including,
acquiring first results of the wireless authentication and the image authentication, and
permitting the user to log in to the image forming apparatus in response to both the wireless authentication and the image authentication being successful based on the first results,
the apparatus authenticator being further configured to perform logout processing after the user is logged in to the image forming apparatus, the logout processing including,
detecting whether the user is present within biometric imaging range,
cancelling permission associated with the image authentication and logging out the user from the image forming apparatus in response to failure to detect the user being present within biometric imaging range, while maintaining permission associated with the wireless authentication for a certain period of time,
restoring permission associated with the image authentication in response to the image authentication being successful based on second results of the image authentication acquired within the certain period of time,
determining whether the user for which permission associated with the image authentication is restored matches a last authenticated user for which the login processing was successful, and
permitting the user to again log in to the image forming apparatus based on the restored permission associated with the image authentication and the maintained permission associated with the wireless authentication in response to the user matching the last authenticated user.

2. The image forming apparatus according to claim 1, wherein the logout processing performed by the apparatus authenticator includes,
cancelling the maintained permission associated with the wireless authentication in response to the image authentication of the user being unsuccessful based on the second results of the image authentication acquired within the certain period of time, and
cancelling the maintained permission associated with the wireless authentication after the certain period of time has elapsed without detecting the user being present within biometric imaging range.

3. The image forming apparatus according to claim 2, wherein the logout processing performed by the apparatus authenticator further includes cancelling the maintained permission associated with the wireless authentication in response to the user for which permission associated with the image authentication is restored not matching the last authenticated user.

4. The image forming apparatus according to claim 1, further comprising a wireless communication unit configured to acquire wireless tag identification information from the short-range wireless tag of the user,
wherein the first authenticator is configured to perform the wireless authentication based on the wireless tag identification information acquired by the wireless communication unit and user information registered in advance.

5. The image forming apparatus according to claim 4, wherein the user information contains user identification information unique to each user of the image forming apparatus and respective wireless tag identification information corresponding to the user identification information, and
the first authenticator is configured to authenticate the user indicated by the user identification information corresponding to the wireless tag identification information in response to the user information containing the wireless tag identification information acquired by the wireless communication unit.

6. The image forming apparatus according to claim 1, further comprising a biometric sensor configured to detect image characteristic information indicating the one or more biometric characteristics of the user,
wherein the second authenticator is configured to perform the image authentication based on the image characteristic information detected by the biometric sensor and user information registered in advance.

7. The image forming apparatus according to claim 6, wherein the biometric sensor is configured to detect a face image of the user from a taken image, and the user information contains user identification information unique to each user of the image forming apparatus and respective image characteristic information corresponding to the user identification information, and
the second authenticator is configured to authenticate the user indicated by the user identification information corresponding to the image characteristic information in response to the user information containing the image characteristic information detected by the biometric sensor.

8. The image forming apparatus according to claim 6, further comprising:
a moving object detector configured to detect a moving object; and
an electric power state controller configured to start up the biometric sensor in response to the moving object detector detecting the moving object.

9. The image forming apparatus according to claim 1, further comprising an electric power state controller configured to shift from a first state to a second state in which less power is consumed than in the first state in response to logging out the user from the image forming apparatus.

10. The image forming apparatus according to claim 1, further comprising:
a moving object detector configured to detect a moving object; and
a wireless communication unit configured to emit a radio wave according to a detection range, and to acquire authentication information from a short-range wireless tag within the detection range, in response to the moving object detector detecting the moving object.

11. The image forming apparatus according to claim 1, comprising:
a main body including at least one image forming engine; and
an operating unit configured to issue operation instructions to the main body, wherein the operating unit includes at least the first authenticator and the second authenticator.

12. A method of authentication by an image forming apparatus, the method comprising:
performing a wireless authentication based on a short-range wireless tag of a user;

performing an image authentication based on one or more biometric characteristics of the user;
performing login processing including,
acquiring first results of the wireless authentication and the image authentication, and
permitting the user to log in to the image forming apparatus in response to both the wireless authentication and the image authentication being successful based on the first results; and
performing logout processing after the user is logged in to the image forming apparatus including,
detecting whether the user is present within biometric imaging range,
cancelling permission associated with the image authentication and logging out the user from the image forming apparatus in response to failure to detect the user being present within biometric imaging range, while maintaining permission associated with the wireless authentication for a certain period of time,
restoring permission associated with the image authentication in response to the image authentication being successful based on second results of the image authentication acquired within the certain period of time,
determining whether the user for which permission associated with the image authentication is restored matches a last authenticated user for which the login processing was successful, and
permitting the user to again log in to the image forming apparatus based on the restored permission associated with the image authentication and the maintained permission associated with the wireless authentication in response to the user matching the last authenticated user.

13. The method according to claim 12, wherein the logout processing includes,
cancelling the maintained permission associated with the wireless authentication in response to the image authentication being unsuccessful based on the second results of the image authentication acquired within the certain period of time, and
cancelling the maintained permission associated with the wireless authentication after the certain period of time has elapsed without detecting the user being present within biometric imaging range.

14. The method according to claim 13, wherein the logout processing further includes cancelling the maintained permission associated with the wireless authentication in response to the user for which permission associated with the image authentication is restored not matching the last authenticated user.

15. A non-transitory computer-readable recording medium with an executable program stored thereon, wherein the executable program when executed instructs a computer of an image forming apparatus to:

perform a wireless authentication based on a short-range wireless tag of a user;
perform an image authentication based on one or more biometric characteristics of the user;
perform login processing including,
acquiring first results of the wireless authentication and the image authentication, and
permitting a the user to log in to the image forming apparatus in response to both the wireless authentication and the image authentication being successful based on the first results; and
perform logout processing after the user is logged in to the image forming apparatus including,
detecting whether the user is present within biometric imaging range,
cancelling permission associated with the image authentication and logging out the user from the image forming apparatus in response to failure to detect the user being present within biometric imaging range, while maintaining permission associated with the wireless authentication for a certain period of time,
restoring permission associated with the image authentication in response to the image authentication being successful based on second results of the image authentication acquired within the certain period of time,
determining whether the user for which permission associated with the image authentication is restored matches a last authenticated user for which the login processing was successful, and
permitting the user to again log in to the image forming apparatus based on the restored permission associated with the image authentication and the maintained permission associated with the wireless authentication in response to the user matching the last authenticated user.

16. The non-transitory computer-readable recording medium according to claim 15, wherein the logout processing includes,
cancelling the maintained permission associated with the wireless authentication in response to the image authentication being unsuccessful based on the second results of the image authentication acquired within the certain period of time, and
cancelling the maintained permission associated with the wireless authentication after the certain period of time has elapsed without detecting the user being present within biometric imaging range.

17. The non-transitory computer-readable recording medium according to claim 16, wherein the logout processing further includes cancelling the maintained permission associated with the wireless authentication in response to the user for which permission associated with the image authentication is restored not matching the last authenticated user.

* * * * *